(12) United States Patent
Silverstein et al.

(10) Patent No.: US 7,334,897 B2
(45) Date of Patent: Feb. 26, 2008

(54) DISPLAY APPARATUS USING LCD PANEL

(75) Inventors: Barry D. Silverstein, Rochester, NY (US); Joshua M. Cobb, Victor, NY (US); David Kessler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/684,844

(22) Filed: Mar. 12, 2007

(65) Prior Publication Data

US 2007/0146640 A1    Jun. 28, 2007

Related U.S. Application Data

(62) Division of application No. 11/120,341, filed on May 3, 2005, now abandoned.

(51) Int. Cl.
*G03B 21/14* (2006.01)
(52) U.S. Cl. .............................. 353/20; 353/84; 353/34; 349/8; 348/743
(58) Field of Classification Search .................... 353/8, 353/20, 31, 34, 37, 84, 94; 348/742, 743, 348/771; 349/5, 7, 8, 9
See application file for complete search history.

(56) References Cited

U.S. PATENT DOCUMENTS

| | | | |
|---|---|---|---|
| 5,612,753 A * | 3/1997 | Poradish et al. | ............ 348/743 |
| 5,640,214 A * | 6/1997 | Florence | ..................... 348/743 |
| 5,729,245 A | 3/1998 | Gove et al. | |
| 5,758,940 A | 6/1998 | Ogino et al. | |
| 5,798,819 A | 8/1998 | Hattori et al. | |
| 5,808,795 A | 9/1998 | Shimomura et al. | |
| 5,845,981 A | 12/1998 | Bradley | |
| 5,867,287 A | 2/1999 | Williams et al. | |
| 5,868,481 A | 2/1999 | Conner et al. | |
| 5,889,614 A | 3/1999 | Cobben et al. | |
| 5,905,545 A * | 5/1999 | Poradish et al. | ............ 348/743 |

(Continued)

FOREIGN PATENT DOCUMENTS

EP    0645661    3/1995

OTHER PUBLICATIONS

Dewald et al.; "Sequential Color Recapture and Dynamic Filtering: A Method of Scrolling Color" SID 01 Digest, pp. 1076-1079, no date available in reference.

*Primary Examiner*—William C. Dowling
(74) *Attorney, Agent, or Firm*—Nelson Adrian Blish

(57) ABSTRACT

A projection apparatus (10) has an illumination section with a light source (20) providing a substantially unpolarized illumination beam of multiple wavelengths. A multiple wavelength polarizer polarizes the substantially unpolarized illumination beam to provide a substantially polarized illumination beam of multiple wavelengths. A uniformizer conditions the substantially polarized illumination beam of multiple wavelengths to provide a uniformized polarized beam of multiple wavelengths. A color scrolling element provides a repeating, scrolled sequence of colors from a set of colors, thereby providing first, second, and third component wavelength illumination. A component wavelength modulating section accepts the sequence of first, second, and third component wavelength illumination from the color scrolling element and sequentially modulates the first, second, and third component wavelength illumination at a transmissive liquid crystal modulator panel (118) to provide a modulated component wavelength beam to a lens for projection toward a display surface (40).

26 Claims, 17 Drawing Sheets

U.S. PATENT DOCUMENTS

| | | |
|---|---|---|
| 5,918,961 A | 7/1999 | Ueda |
| 5,975,704 A | 11/1999 | Basey |
| 6,010,221 A | 1/2000 | Maki et al. |
| 6,062,694 A | 5/2000 | Oikawa et al. |
| 6,113,239 A | 9/2000 | Sampsell et al. |
| 6,231,192 B1 | 5/2001 | Konno et al. |
| 6,280,034 B1 | 8/2001 | Brennesholtz |
| 6,452,724 B1 | 9/2002 | Hansen et al. |
| 6,505,940 B1 | 1/2003 | Gotham et al. |
| 6,513,932 B1 | 2/2003 | Ehrne et al. |
| 6,585,378 B2 | 7/2003 | Kurtz et al. |
| 6,637,888 B1 | 10/2003 | Haven |
| 6,676,260 B2 | 1/2004 | Cobb et al. |
| 6,736,514 B2 * | 5/2004 | Horvath et al. .............. 353/31 |
| 6,739,723 B1 | 5/2004 | Haven et al. |
| 6,758,565 B1 | 7/2004 | Cobb et al. |
| 6,758,579 B2 * | 7/2004 | Ishikawa et al. ............ 362/238 |
| 6,793,351 B2 | 9/2004 | Nelson et al. |
| 6,805,445 B2 | 10/2004 | Silverstein et al. |
| 6,808,269 B2 | 10/2004 | Cobb |
| 6,814,450 B2 * | 11/2004 | Kim .............................. 353/94 |
| 6,831,722 B2 | 12/2004 | Ishikawa et al. |
| 6,913,360 B2 | 7/2005 | Cho et al. |
| 6,962,414 B2 * | 11/2005 | Roth ........................... 353/20 |
| 7,077,524 B2 * | 7/2006 | Roth ........................... 353/20 |
| 7,104,651 B2 | 9/2006 | Kim et al. |
| 7,177,084 B2 * | 2/2007 | Kim et al. .................... 359/638 |
| 7,188,953 B2 * | 3/2007 | Silverstein et al. ............ 353/20 |
| 7,198,373 B2 * | 4/2007 | Silverstein et al. ............ 353/31 |
| 2003/0179322 A1 | 9/2003 | Sacre |
| 2003/0197837 A1 | 10/2003 | Lee |

\* cited by examiner

DISPLAY APPARATUS USING LCD PANEL

CROSS REFERENCE TO RELATED APPLICATIONS

This is a divisional of application Ser. No. 11/120,341, filed May 3, 2005 now abandoned.

FIELD OF THE INVENTION

This invention generally relates to electronic projection and more particularly relates to an electronic projection apparatus using a single LC modulator panel for forming a full color projection image.

BACKGROUND OF THE INVENTION

Liquid crystal (LC) technology has been successfully harnessed to serve numerous display applications, ranging from monochrome alphanumeric display panels, to laptop computers, and even to large-scale full color displays. As is well known, an LC device forms an image as an array of pixels by selectively modulating the polarization state of incident light for each corresponding pixel. Continuing improvements of LC technology have yielded the benefits of lower cost, improved yields and reliability, and reduced power consumption and with steadily improved imaging characteristics, such as resolution, speed, and color.

One type of LC display component, commonly used for laptops and larger display devices, is the so-called "direct view" LCD panel, in which a layer of liquid crystal is sandwiched between two sheets of glass or other transparent material. Continuing improvement in thin-film transistor (TFT) technology has proved beneficial for direct view LCD panels, allowing increasingly denser packing of transistors into an area of a single glass pane. In addition, new LC materials that enable thinner layers and faster response time have been developed. This, in turn, has helped to provide direct view LCD panels having improved resolution and increased speed. Thus, larger, faster LCD panels having improved resolution and color are being designed and utilized successfully for full motion imaging.

Alternatively, miniaturization and the utilization of microlithographic technologies have enabled development of LC devices of a different type. Liquid crystal on silicon (LCOS) technology has enabled the development of highly dense spatial light modulators by sealing the liquid crystal material against the structured backplane of a silicon circuit. Essentially, LCOS fabrication combines LC design techniques with complementary metal-oxide semiconductor (CMOS) manufacturing processes.

Using LCOS technology, LC chips having imaging areas typically smaller than one square inch are capable of forming images having several million pixels. The relatively mature level of silicon etching technology has proved to be advantageous for the rapid development of LCOS devices exhibiting high speeds and excellent resolution. LCOS devices have been used as spatial light modulators in applications such as rear-projection television and business projection apparatus.

With the advent of digital cinema and related electronic imaging opportunities, considerable attention has been directed to development of electronic projection apparatus. In order to provide a competitive alternative to conventional cinematic-quality film projectors, digital projection apparatus must meet high standards of performance, providing high resolution, wide color gamut, high brightness, and frame-sequential contrast ratios exceeding 1,000:1. LCOS LCDs appear to have advantages as spatial light modulators for high-quality digital cinema projection systems. These advantages include relatively large device size, small gaps between pixels, and favorable device yields.

Referring to FIG. 1, there is shown a simplified block diagram of a conventional electronic projection apparatus 10 using LCOS LCD devices. Each color path (r=red, g=green, b=blue) uses similar components for forming a modulated light beam. Individual components within each path are labeled with an appended r, g, or b, appropriately. Following the red color path, a red light source 20r provides unmodulated light, which is conditioned by uniformizing optics 22r to provide a uniform illumination. A polarizing beamsplitter 24r directs light having the appropriate polarization state to a spatial light modulator 30r which selectively modulates the polarization state of the incident red light over an array of pixel sites. The action of spatial light modulator 30r forms the red component of a full color image. The modulated light from this image, transmitted along an optical axis $O_r$ through polarizing beamsplitter 24r, is directed to a dichroic combiner 26, typically an X-cube or a Philips prism. Dichroic combiner 26 combines the red, green, and blue modulated images from separate optical axes $O_r/O_g/O_b$ to form a combined, multicolor image for a projection lens 32 along a common optical axis O for projection onto a display surface 40, such as a projection screen. Optical paths for blue and green light modulation are similar. Green light from green light source 20g, conditioned by uniformizing optics 22g is directed through a polarizing beamsplitter 24g to a spatial light modulator 30g. The modulated light from this image, transmitted along an optical axis $O_g$, is directed to dichroic combiner 26. Similarly red light from red light source 20r, conditioned by uniformizing optics 22r is directed through a polarizing beamsplitter 24r to a spatial light modulator 30r. The modulated light from this image, transmitted along an optical axis $O_r$, is directed to dichroic combiner 26.

Among examples of electronic projection apparatus that utilize LCOS LCD spatial light modulators with an arrangement similar to that of FIG. 1 are those disclosed in U.S. Pat. No. 5,808,795 (Shimomura et al.); U.S. Pat. No. 5,798,819 (Hattori et al.); U.S. Pat. No. 5,918,961 (Ueda); U.S. Pat. No. 6,010,221 (Maki et al.); U.S. Pat. No. 6,062,694 (Oikawa et al.); U.S. Pat. No. 6,113,239 (Sampsell et al.); and U.S. Pat. No. 6,231,192 (Konno et al.)

As each of the above-cited patents shows, developers of motion-picture quality projection apparatus have primarily directed their attention and energies to LCOS LCD technology, rather than to solutions using TFT-based, direct view LC panels. There are a number of clearly obvious reasons for this. For example, the requirement for making projection apparatus as compact as possible argues for the deployment of miniaturized components, including miniaturized spatial light modulators, such as the LCOS LCDs or other types of compact devices such as digital micromirrors. The highly compact pixel arrangement, with pixels typically sized in the 10-20 micron range, allows a single LCOS LCD to provide sufficient resolution for a large projection screen, requiring an image in the range of 2048×1024 or 4096×2048 pixels or better as required by Society of Motion Picture and Television Engineers (SMPTE) specifications for digital cinema projection. Other reasons for interest in LCOS LCDs over their direct-view LCD panel counterparts relates to performance attributes of currently available LCOS components, attributes such as response speed, color, and contrast.

Yet another factor that tends to bias projector development efforts toward miniaturized devices relates to the dimensional characteristics of the film that is to be replaced. That is, the image-forming area of the LCOS LCD spatial light modulator, or its digital micromirror device (DMD) counterpart, is comparable in size to the area of the image frame that is projected from the motion picture print film. This may somewhat simplify some of the projection optics design. However, this interest in LCOS LCD or DMD devices also results from an unquestioned assumption on the part of designers that image formation at smaller dimensions is most favorable. Thus, for conscious reasons, and in line with conventional reasoning and expectations, developers have assumed that the miniaturized LCOS LCD or DMD provides the most viable image-forming component for high-quality digital cinema projection.

One problem inherent with the use of miniaturized LCOS and DMD spatial light modulators relates to brightness and efficiency. As is well known to those skilled in the imaging arts, any optical system is constrained by the LaGrange invariant. A product of the area of the light-emitting device and the numerical aperture of the emitted light, the LaGrange invariant is an important consideration for matching the output of one optical system with the input of another and determines output brightness of an optical system. In simple terms, only so much light can be provided from an area of a certain size. As the LaGrange invariant shows, when the emissive area is small, a large angle of emitted light is needed in order to achieve a certain level of brightness. Added complexity and cost result from the requirement to handle illumination at larger angles. This problem is noted and addressed in commonly-assigned U.S. Pat. No. 6,758,565 (Cobb et al.); U.S. Pat. No. 6,808,269 (Cobb); and U.S. Pat. No. 6,676,260 (Cobb et al.) These patents disclose electronic projection apparatus design using higher numerical apertures at the spatial light modulator for obtaining the necessary light while reducing angular requirements elsewhere in the system.

A related consideration is that image-forming components also have limitations on energy density. With miniaturized spatial light modulators, and with LCOS LCDs in particular, only so much energy density can be tolerated at the component level. That is, a level of brightness beyond a certain threshold level can damage the device itself. Typically, energy density above about 15 W/cm$^2$ would be excessive for an LCOS LCD. This, in turn, constrains the available brightness when using an LCOS LCD of 1.3 inch in diameter to no more than about 15,000 lumens. Heat build-up must also be prevented, since this would cause distortion of the image, color aberrations, and could shorten the lifespan of the light modulator and its support components. In particular, the behavior of the absorptive polarization components used can be significantly compromised by heat build-up. This requires substantial cooling mechanisms for the spatial light modulator itself and careful engineering considerations for supporting optical components. Again, this adds cost and complexity to optical system design.

Still other related problems with LCOS LCDs relate to the high angles of modulated light needed. The mechanism for image formation in LCD devices and the inherent birefringence of the LCD itself limit the contrast and color quality available from these devices when incident illumination is highly angular. In order to provide suitable levels of contrast, one or more compensator devices must be used in an LCOS system. This, however, further increases the complexity and cost of the projection system. An example of this is disclosed in commonly-assigned U.S. Pat. No. 6,831,722 (Ishikawa et al.), which discloses the use of compensators for angular polarization effects of wire grid polarizers and LCD devices. For these reasons, it can be appreciated that LCOS LCD and DMD solutions face inherent limitations related to component size and light path geometry.

There have been various projection apparatus solutions proposed using the alternative direct view TFT LC panels. However, in a number of cases, these apparatus have been proposed for specialized applications, and are not intended for use in high-end digital cinema applications. For example, U.S. Pat. No. 5,889,614 (Cobben et al.) discloses the use of a TFT LC panel device as an image source for an overhead projection apparatus. U.S. Pat. No. 6,637,888 (Haven) discloses a rear screen TV display using a single subdivided TFT LC panel with red, green, and blue color sources, using separate projection optics for each color path. Commonly-assigned U.S. Pat. No. 6,505,940 (Gotham et al.) discloses a low-cost digital projector with a large-panel LC device encased in a kiosk arrangement to reduce vertical space requirements. While each of these examples employs a larger LC panel for image modulation, none of these designs is intended for motion picture projection at high resolution, having good brightness levels, color comparable to that of conventional motion picture film, acceptable contrast, and a high level of overall image quality.

One attempt to provide a projection apparatus using TFT LC panels is disclosed in U.S. Pat. No. 5,758,940 (Ogino et al.) In the Ogino et al. '940 apparatus, one or more Fresnel lenses is used to provide collimated illumination to the LC panel; another Fresnel lens then acts as a condenser to provide light to projection optics. Because it provides an imaging beam over a wide area, the Ogino et al. '940 apparatus is advantaged for its high light output, based on the Lagrange invariant described above. However, while it offers potential applications for TV projection apparatus and small-scale projectors, the proposed solution of the Ogino et al. '940 disclosure falls short of the performance levels necessary for high-resolution projection systems that modulate light and provide imaged light output having high intensity, at levels of 10,000 lumens and beyond.

Thus, it can be seen that, although digital cinema projection apparatus solutions have focused on the use of LCOS LCDs for image forming, there are inherent limitations in brightness and efficiency when using LCOS LCD components for this purpose. TFT LC panel solutions, meanwhile, would provide enhanced brightness levels over LCOS solutions. While projection apparatus using TFT LC panels have been disclosed, these have not been well suited to the demanding brightness requirements of high-performance digital cinema projection.

In cinema applications, the projector projects the modulated image onto a display screen or surface, where this surface may be at a variable distance from the projector. This requires that the projector provide some type of focus adjustment as well as color alignment adjustment. With conventional LCOS apparatus such as that shown in FIG. 1, color alignment is performed by color combining optics, so that the three composite RGB colors are projected along the same axis. However, for solutions using TFT devices, there would be benefits to providing separate projection optics for red, green, and blue paths. Some of these benefits include simpler and less costly lenses with color correction for a narrow wavelength band at each lens. With such an approach, some alignment method must then be provided to form the color image from properly superimposed red, green, and blue images, thereby allowing the projector to be used over a range of distances from a display screen.

Other problems relate to the nature of light modulation by the TFT LC device and to the support components necessary for high brightness applications requiring high levels of image quality. Conventional solutions would constrain both the light output levels and overall image quality, obviating the advantages afforded by TFT use for projection applications. For example, the use of absorptive polarizers directly attached to the TFT panels, as these devices are commonly provided, is disadvantageous for image quality. Heat absorption from these films, typically exceeding 20% of the light energy, causes consequent heating of the LCD materials, resulting in a loss of contrast and contrast uniformity.

Thus, it can be seen that there is a need for a full-color projection apparatus that takes advantage of inherent etendue-related advantages of TFT LC devices and provides improved image quality.

SUMMARY OF THE INVENTION

It is an object of the present invention to provide a projection apparatus comprising:
  a) an illumination section comprising:
    i) a light source providing a substantially unpolarized illumination beam of multiple wavelengths;
    ii) a multiple wavelength polarizer for polarizing the substantially unpolarized illumination beam to provide a substantially polarized illumination beam of multiple wavelengths;
    iii) a uniformizer for conditioning the substantially polarized illumination beam of multiple wavelengths to provide a uniformized polarized beam of multiple wavelengths;
    iv) a color scrolling element for providing a repeating, scrolled sequence of colors from a set of colors, thereby providing a first component wavelength illumination, a second component wavelength illumination, and a third component wavelength illumination; and
  b) a component wavelength modulating section for accepting the sequence of first, second, and third component wavelength illumination from the color scrolling element and sequentially modulating the first, second, and third component wavelength illumination at a transmissive liquid crystal modulator panel to provide a modulated component wavelength beam to a lens for projection toward a display surface.

It is a feature of the present invention that, unlike current approaches that use miniaturized LCOS LCDs, the apparatus of the present invention employs a single LCD panel for imaging in a projection apparatus intended for high-end electronic imaging applications.

It is an advantage of the present invention that it allows added brightness for the projected image. Various types of light sources could be used.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 2:
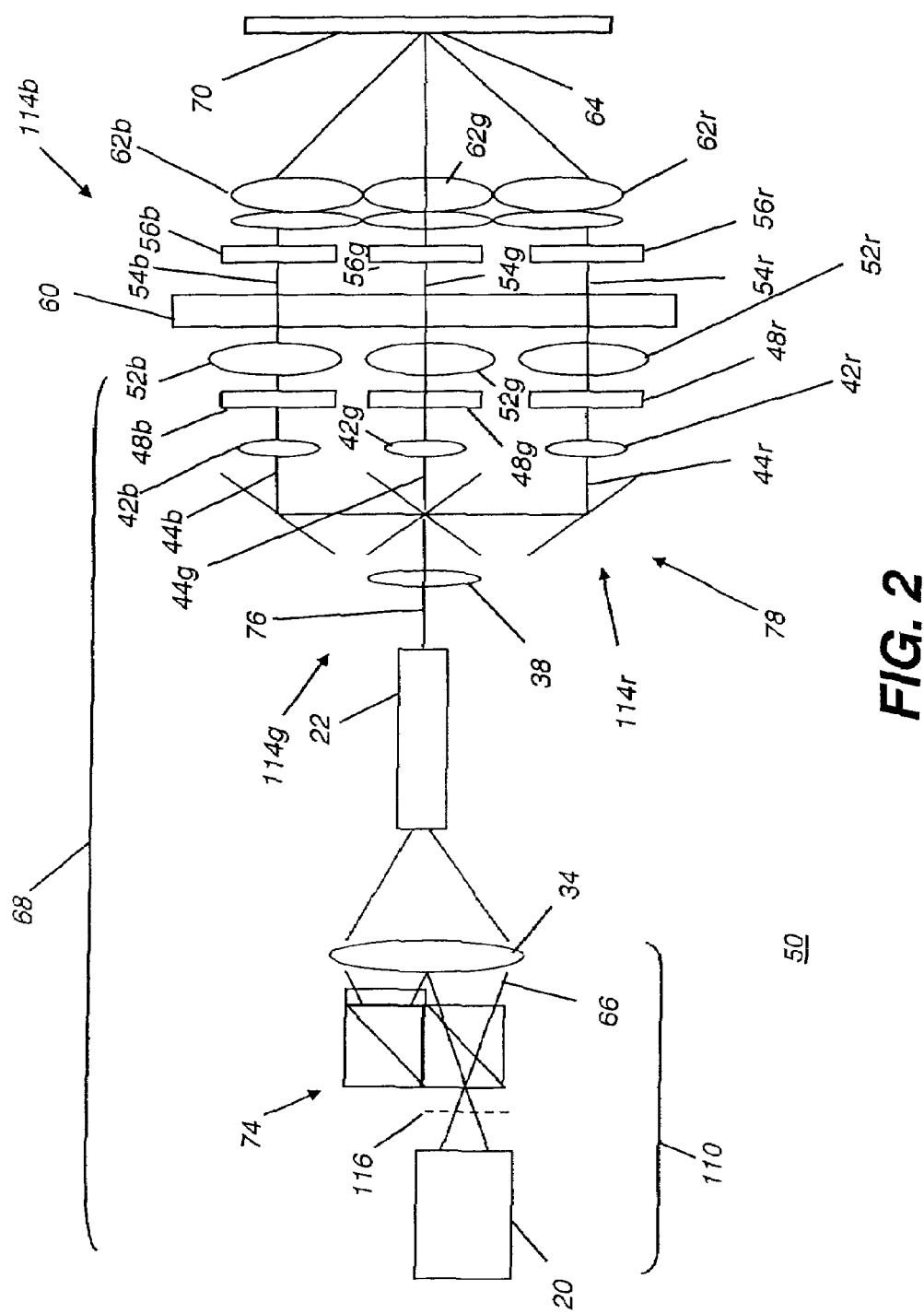
FIG. 2 is a block diagram showing a projection apparatus using a large-scale TFT LC display according to the present invention.
Figure 4:
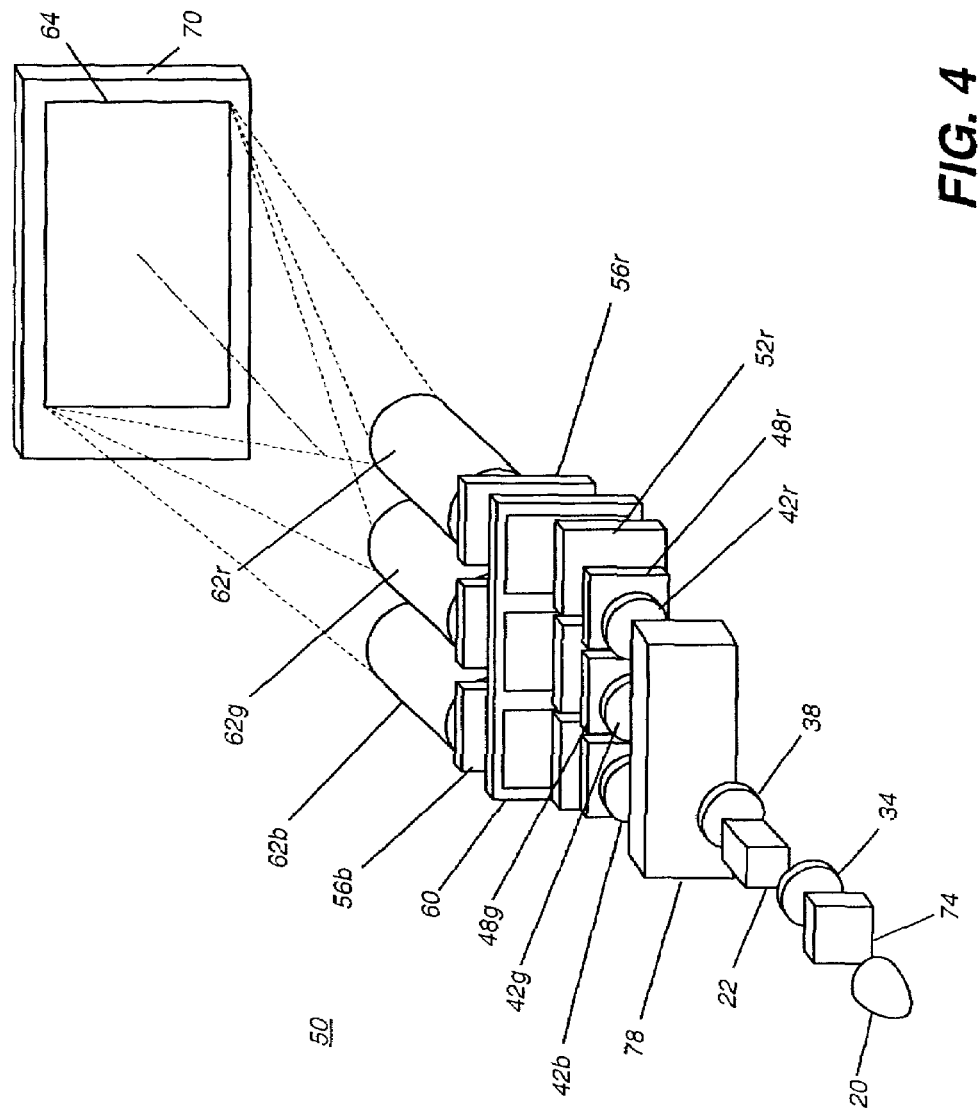
FIG. 4 is a perspective view of a projection apparatus according to the present invention.

Referring to FIG. 2, there is shown an embodiment of a projection apparatus 50 designed for large-scale, high-brightness projection applications according to an embodiment of the present invention. Unlike conventional projection apparatus described in the background section given above, projection apparatus 50 utilizes techniques to boost overall efficiency and light output, suited to the demanding requirements of high luminance projection. FIG. 4 shows key components of projection apparatus 50 in a perspective view. FIG. 4 is representative for a configuration in which LC modulator panel 60 is segmented into three portions in side-by-side or horizontal fashion; this is an alternative to the configuration of FIG. 2 in which modulator panel 60 is segmented vertically. The best configuration for any particular embodiment, whether segmented vertically or horizontally, as described subsequently, would depend on the overall width:height aspect ratio of LC modulator panel 60 and the intended image 64.

An illumination section 68 has a light source 20 for providing unpolarized illumination having multiple wavelengths, typically, white light. Light source 20 directs this illumination to a multiple wavelength polarizer 74 for providing a substantially polarized illumination beam 66. A lens 34 directs polarized illumination beam 66 to a uniformizing element 22 to provide a uniformized polarized beam 76 having multiple wavelengths. A condensing lens 38 then directs uniformized polarized beam 76 to a color separator 78 that separates the multiple wavelengths into component color wavelengths, conventionally red, green, and blue (RGB) along separate illumination paths 44r (red), 44g (green) and 44b (blue).

There are at least three component wavelength modulating sections 114r, 114g, 114b, as shown in FIG. 2, each aligned along a corresponding illumination path 44r, 44g, 44b. In each component wavelength modulating section 114r, 114g, 114b, a condensing lens 42r, 42g, 42b directs the corresponding component wavelength illumination through a polarizer 48r, 48g, 48b. Fresnel lenses 52r, 52g, and 52b then focus this illumination through a monochrome transmissive liquid crystal modulator panel 60 that is segmented to handle each component color for modulation, as is described subsequently. Liquid crystal modulator panel 60 forms red, green, and blue component wavelength beams 54r, 54g, and 54b. Component wavelength beams 54r, 54g, and 54b are the modulated light beams that are combined to form the color image. Analyzers 56r, 56g, and 56b condition the polarization of red, green, and blue component wavelength beams 54r, 54g, and 54b prior to projection by projection lenses 62r, 62g, and 62b that project each of the modulated component wavelength beams 54r, 54g, and 54b respectively to a display surface 70. Here, the modulated component wavelength beams 54r, 54g, and 54b are superimposed to form a color image 64 on display surface 70.

Broadband Polarization

Figure 5:
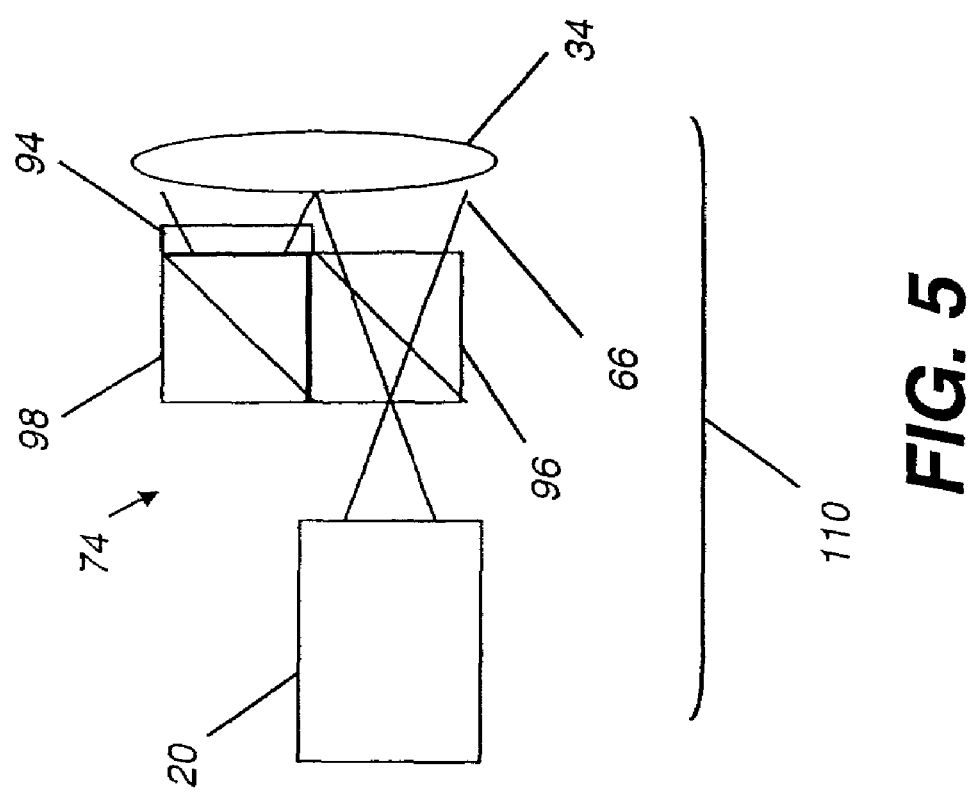
FIG. 5 is a block diagram showing a projection apparatus with a control loop for alignment.

Referring to FIG. 5, exemplary components of multiple wavelength polarizer 74 in a polarized light providing apparatus 110 within illumination section 68 are shown in more detail. In this embodiment, a polarizer 96 transmits light having p-polarization and reflects light having s-polarization. A mirror 98, or reflective polarization sensitive coating, then directs the light having s-polarization through a half wave plate 94. Half wave plate 94 converts this incident light to p-polarization. In this way, polarized illumination beam 66 at lens 34 has the same polarization state. Thus, substantially all of the light output from light source 20 is converted to light having the same polarization state for modulation. This method provides light over a wider area and can be used with larger transmissive LC panels. Conventional LCOS LCD projection systems, limited by the LaGrange invariant, cannot fully take advantage of this type of light output.

In one embodiment, polarizer 96 is a wire grid polarizer, such as the polarizer type disclosed in U.S. Pat. No. 6,452,724 (Hansen et al.) Wire grid polarizers of various types are commercially available from Moxtek, Inc., Orem, Utah. The wire grid type of polarizer is particularly advantaged for handling high levels of light intensity, unlike conventional types of absorptive polarizer. In one embodiment this wire grid polarizer would be placed such that its wire elements on its wire surface side face toward the LCD panel. This configuration reduces thermally induced birefringence as disclosed in commonly assigned U.S. Pat. No. 6,585,378 (Kurtz et al.) Polarizer 96 could alternately be a conventional prism polarizer, such as a MacNeille polarizer, familiar to those skilled in the electronic imaging arts.

Illumination Source and Optics

A notable improvement over conventional TFT LC projection apparatus is the use of uniformizing optics 22 for providing a uniform illumination from a light source 20. Uniformizing optics 22 condition the output from light source 20 to provide a uniformly bright illumination beam for modulation. In one embodiment, an integrating bar provides uniformizing optics 22. Alternate embodiments include the use of a lenslet array or some combination of lenslet and other integrating components.

Light source 20 can be any of a number of types of lamp or other emissive component. It can be appreciated that it would be particularly advantageous to select a commercially available component as light source 20, to take advantage of low cost and availability due to high manufacturing volumes. In one embodiment, a conventional CERMAX® xenon arc lamp, available from PerkinElmer Inc., Wellesley, Mass., is used. The capability to use such off-the-shelf devices is a particular advantage when using a larger size TFT LC device, as opposed to using smaller LCOS components that typically require custom light source solutions. Other alternative light sources include high-power LEDs, which can be distributed in an array when using uniformizing optics 22. Another option is to use ultra-high pressure Mercury lamps, for example. Conventional xenon bubble lamps offer yet another option and provide better color gamut than Mercury lamps.

An optional shutter 116, whose position may be at the location of the dotted line in FIG. 2, may be implemented within illumination system 68 in order to momentarily darken the display to allow time for a suitable transition between images. Shutter 116 may be needed depending on LC modulator panel 60 response speed. Although response speeds of LC modulator panels 60 have improved sufficiently for conventional video, it remains to be seen if there will be sufficient improvement to allow imaging with ghost free motion, particularly with image content that contains considerable action and transitions. Shutter 116 would be used to block the light to LC modulator panel 60 during transition times, effectively reducing the overlay of images between frames. A suitable shutter mechanism is disclosed, for example, in commonly-assigned U.S. Pat. No. 6,513,932 (Ehrne et al.)

Color Separation

Figure 6:
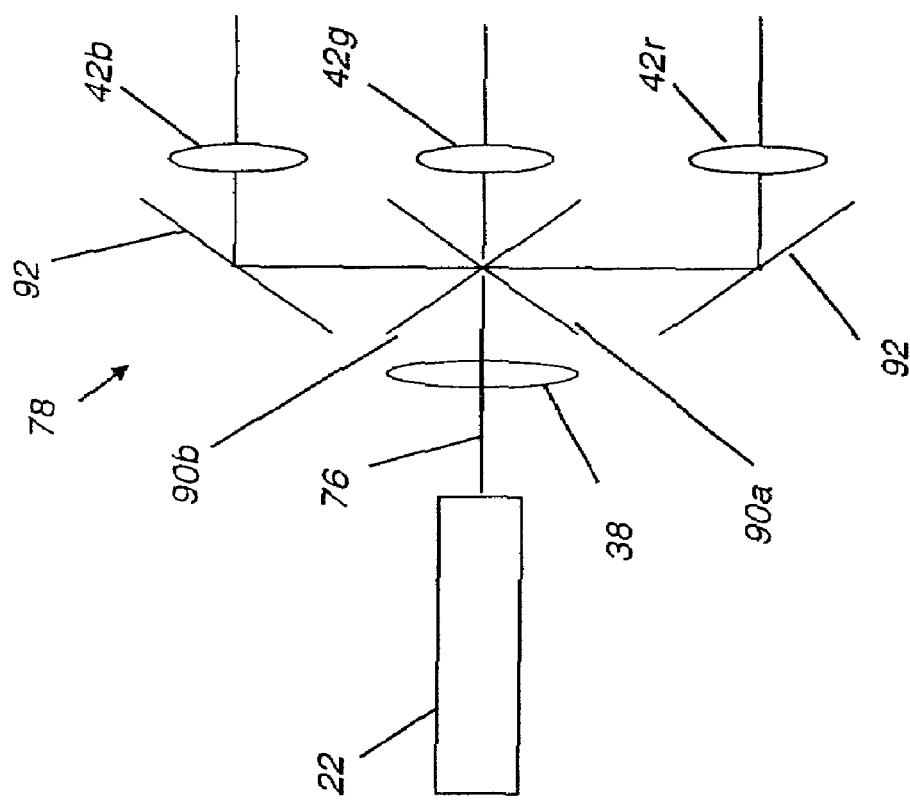
FIG. 6 is a plan view of an LCD modulator panel subdivided into component color modulating sections according to the present invention.

As was shown in FIG. 2, uniformized polarized beam 76 that is output from uniformizing optics 22 next goes to color separator 78. FIG. 6 shows the components of color separator 78 in more detail. An arrangement of crossed dichroic surfaces 90a, 90b is used to split the multiple wavelength light of uniformized polarized beam 76 into the key red, green, and blue component wavelengths for modulation as red, green, and blue component wavelength beams 54r, 54g, and 54b, respectively. Turning mirrors 92 redirect red and blue component wavelength beams 54r and 54b in the embodiment of FIG. 6. Alternate embodiments include use of dichroic separating components in a fashion such that more than three color bands are separated, enabling a larger color gamut.

The improved light efficiency afforded by modulator panel 60 can be utilized to provide a projection gamut that is substantially larger than that provided using conventional video, such as SMPTE "C" color space or even proposed digital cinema SMPTE gamut defined by (Red: 0.680 x, 0.320 y, 10.1 Y, Green: 0.265 x, 0.690 y, 34.6 Y, Blue: 0.150 x, 0.060 y, 3.31 Y). There is interest in making the gamut at least as large or larger than that of motion picture film. Dichroic filters can be selected and positioned to block portions of the spectral bands between the typical component color bands blue, green, and red, thereby increasing the color space that projection apparatus 10 works within.

Configuration of Modulator Panel 60

One aspect of the present invention relates to the segmentation of monochrome liquid crystal modulator panel 60, as shown in the plan view of FIG. 6. The red, green, and blue component colors in respective red, green, and blue illumination paths 44r, 44g, and 44b (FIG. 2) are modulated by a red component modulating section 80r; a green component modulating section 80g, and a blue component modulating section 80b, respectively. In one embodiment, where LC modulator panel 60 has 2048×3240 pixel resolution, each component color modulating section 80r, 80g, and 80b has 2048×1080 pixel resolution. Higher resolution panel alternatives would be advantaged for applications such as digital cinema.

Each modulating section 80r, 80g, 80b has a corresponding border portion 82r, 82g, 82b. Border portions 82r, 82g, 82b include some number of pixels that are unused but available to be used as part of modulating section 80r, 80g, 80b. Border portions 82r, 82g, 82b are used to facilitate alignment of the component color modulated light, as is described subsequently.

Each modulating section 80r, 80g, 80b is separated from its adjacent modulating section(s) 80r, 80g, 80b by a light blocking segment 84a, 84b. Light blocking segments 84a, 84b consist of pixels in a dark or black state, acting as masks for reflecting overlapping light from adjacent red, green, and blue illumination paths 44r, 44g, and 44b. Physical blocking elements may be used in addition to or in lieu of these dark state pixels.

Figure 3:
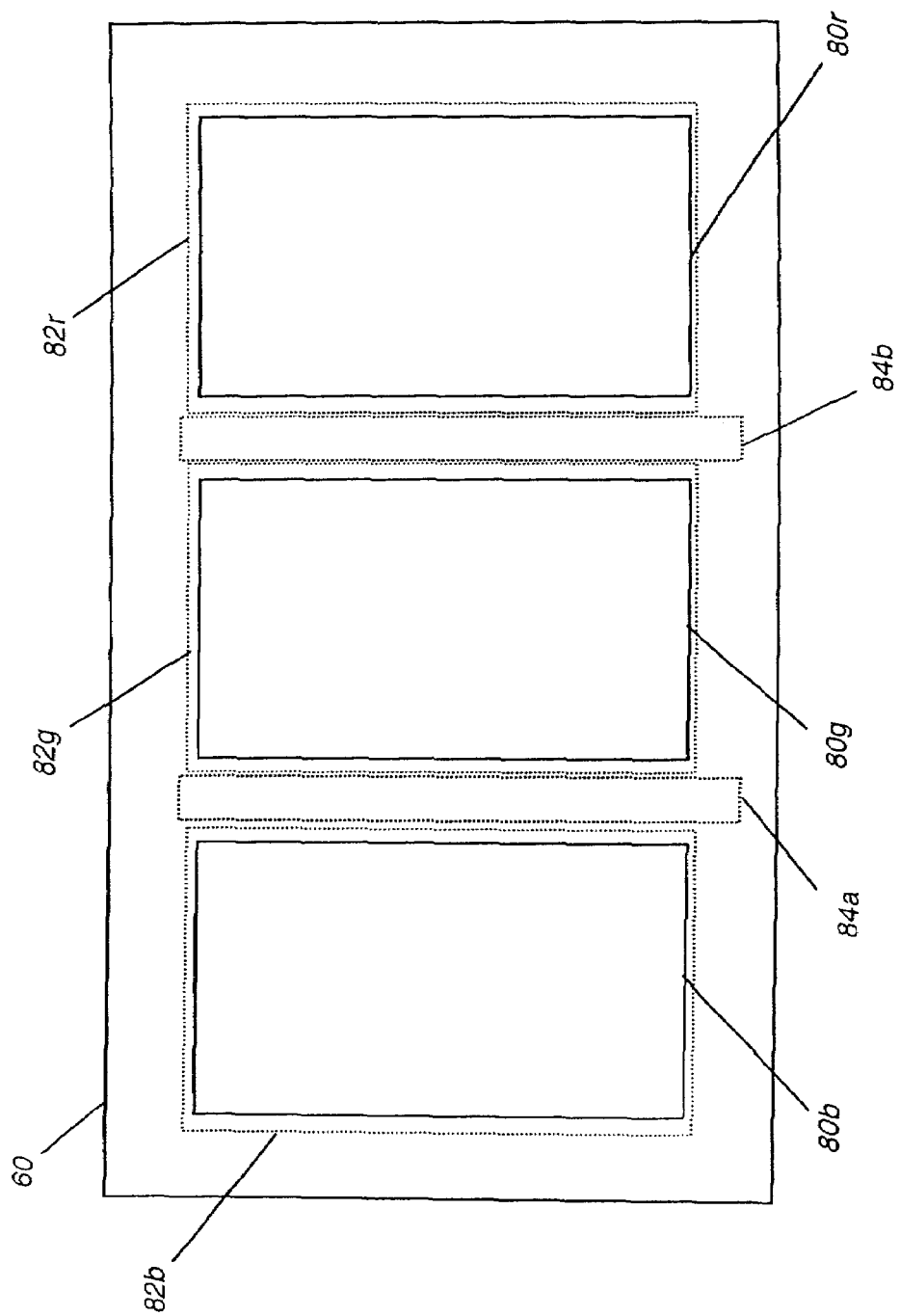
FIG. 3 is a plan view of a TFT LC device segmented according to the present invention.
Figure 9A:
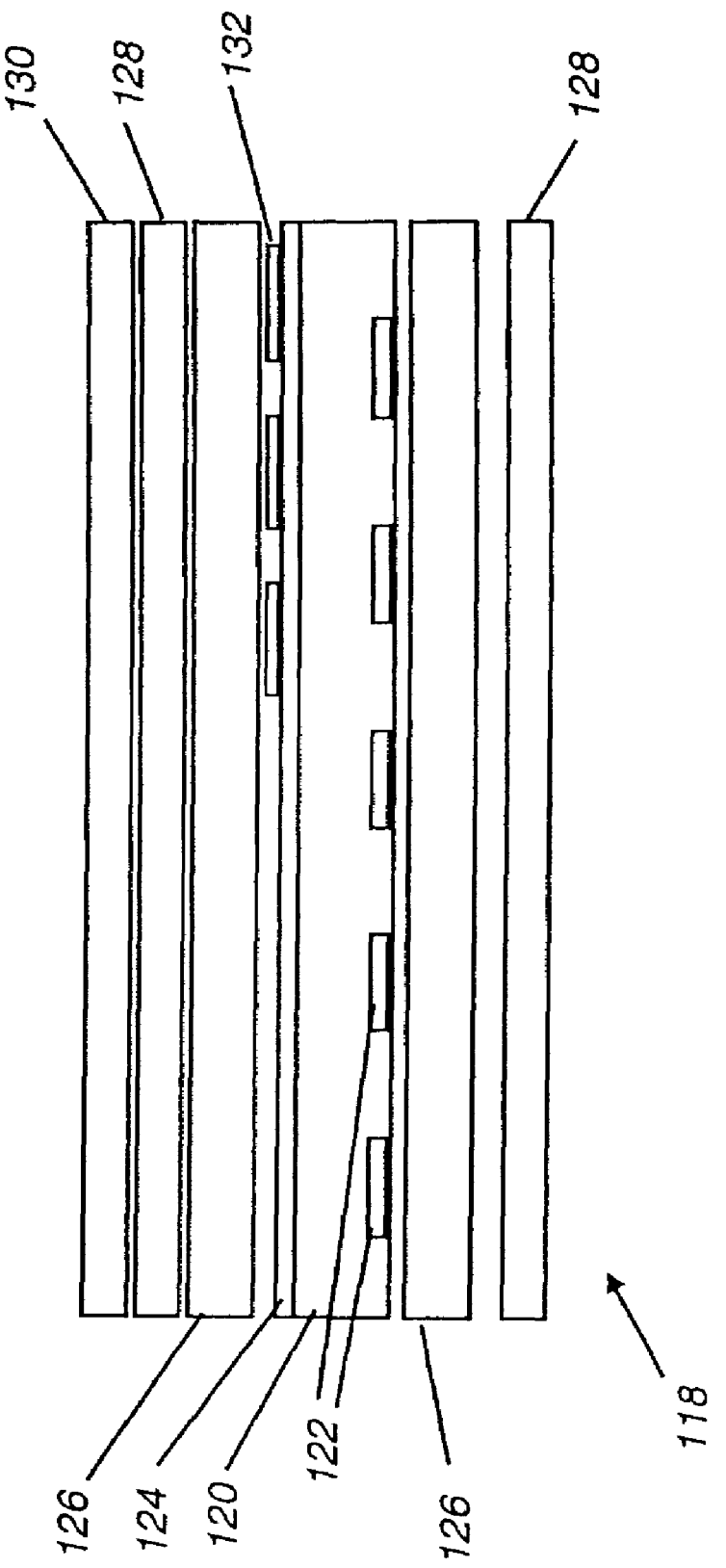
FIG. 9A is a cross section of a conventional large panel LC device.

In the embodiments of FIGS. 2-4, LC modulator panel 60 is modified and simplified for use in a projection application. Referring first to FIG. 9A, there is shown a conventional LC modulator panel 118 as provided by the manufacturer for display use. In this conventional arrangement, LC material 120, with its control electrodes on an ITO layer 124 and thin-film transistors 122 is sandwiched between plates of glass 126, along with a color filter array 132. Front and rear polarizers 128 are absorptive sheets whose performance is compromised by high heat levels, causing variable thermal nonuniformities in the projected image. A compensation film 130 is also provided for enhancing contrast. In many devices, other enhancement films are used but not shown, such as diffusing layers.

Figure 9B:
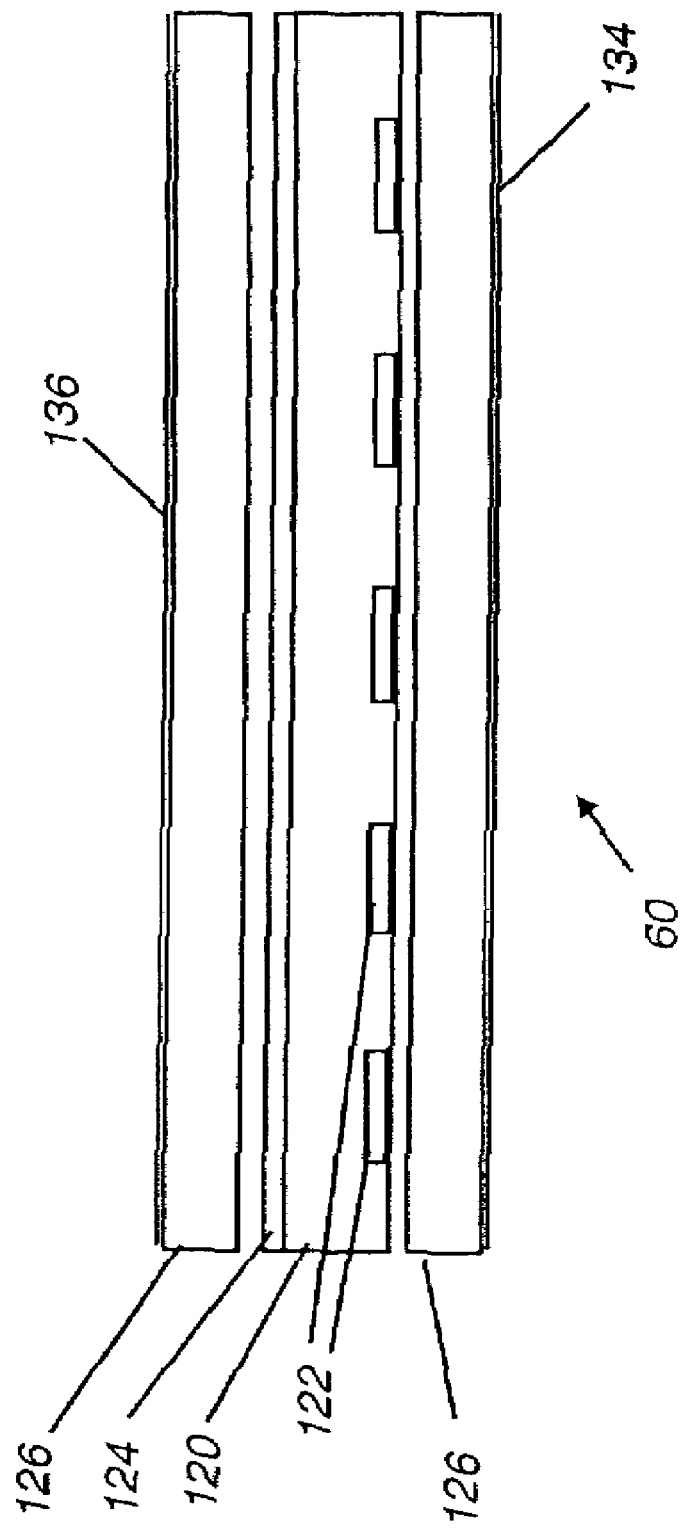
FIG. 9B is a cross section of a simplified large panel LC device according to the present invention.

FIG. 9B shows the simplified arrangement of LC modulator panel 60 as used in the present invention. Compensation film 130 may be removed; even if maintained, the performance requirements and cost of compensation film 130 are significantly reduced. Front and rear polarizers 128 are also removed from LC modulator panel 60 itself; separate wire grid polarizers are used for polarizers 48r, 48g, 48b and analyzers 56r, 56g, 56b. Polarizers 48r, 48g, 48b and analyzers 56r, 56g, 56b are spaced apart from the surface of glass sheets 126. Wire grid polarizers, capable of handling high light levels without absorbing substantial amounts of light energy, are particularly well suited to high intensity application in projection apparatus 50. Spacing them apart from LC material 120 prevents heat transfer that would negatively impact the uniformity of the image. Color filter array 132 is no longer needed. An optional antireflection coating 134, 136 may be provided on both external surfaces of glass 126. Antireflection coating 134, 136 would help to reduce checkerboard effects and increase the ANSI contrast ratio, minimizing the interactions of neighboring pixels from stray light.

Fresnel Lenses

Use of Fresnel lenses 52r, 52g, and 52b in illumination paths 44r, 44g, and 44b, as shown in FIG. 2, is particularly advantageous for directing light toward the entrance pupils of corresponding projection lenses 62r, 62g, and 62b. By placing Fresnel lenses 52r, 52g, and 52b in illumination paths 44r, 44g, and 44b, imaging aberrations are minimized. Fresnel lenses are typically molded and may exhibit non-uniformities that are particularly visible if the lens is used with image-modulated light.

Figure 10:
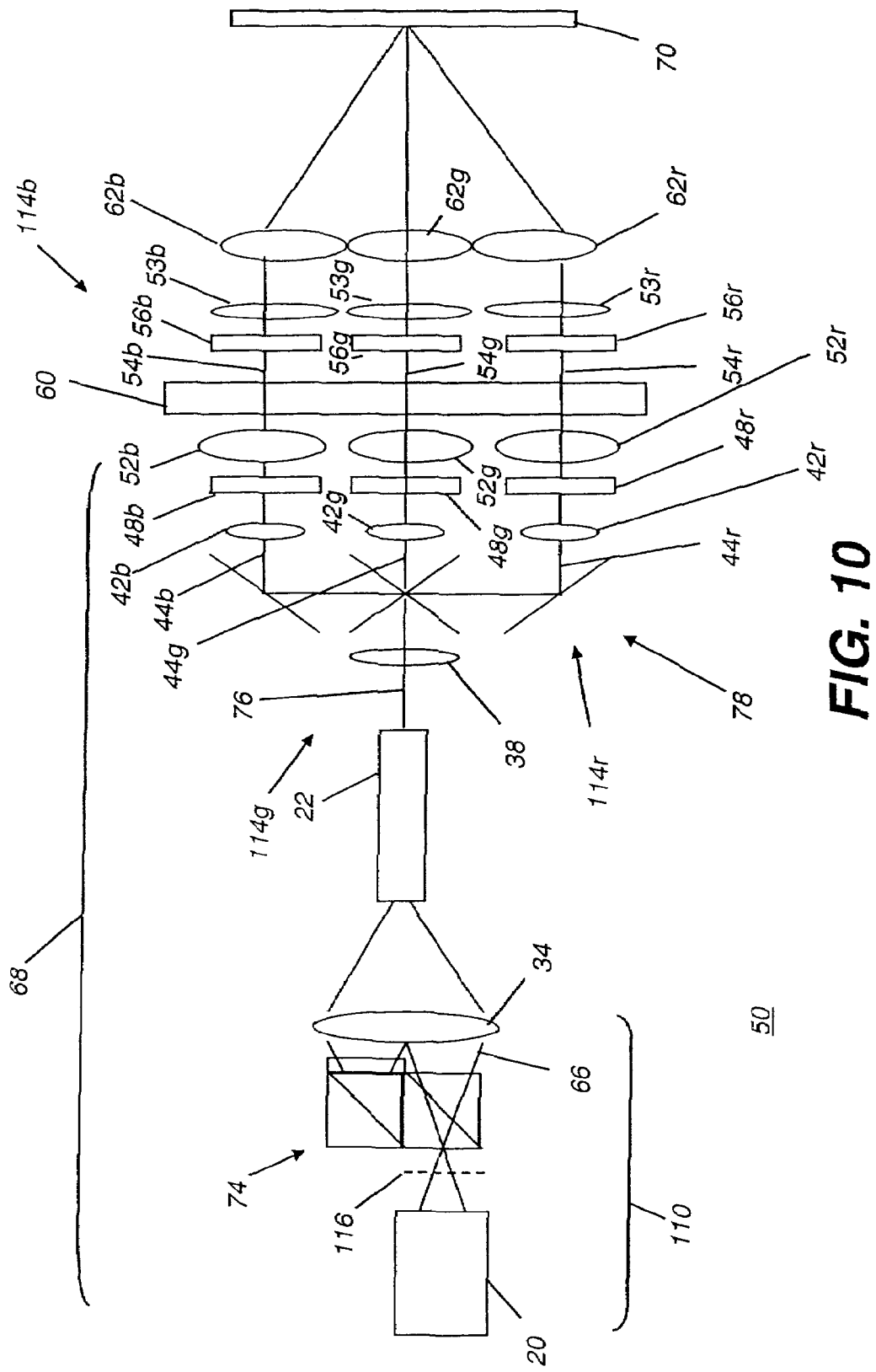
FIG. 10 is a schematic block diagram showing an alternate embodiment with two Fresnel lenses in each color channel.

FIG. 10 shows an alternate embodiment using a pair of Fresnel lenses in each component wavelength modulating section 114r, 114g, and 114b, one placed as an illumination path Fresnel lens in each illumination path 44r, 44g, 44b, the other placed as a modulated beam Fresnel lens in each modulated component wavelength beam 54r, 54g, 54b. In the blue color channel, Fresnel lens 52b is in illumination path 44b; a second Fresnel lens 53b is in component wavelength beam 54b. In the green color channel, Fresnel lens 52g is in illumination path 44g; a second Fresnel lens 53g is in the modulated component wavelength beam 54g. In the red color channel, Fresnel lens 52r is in illumination path 44r; a second Fresnel lens 53r is in modulated component wavelength beam 54r. With the arrangement of FIG. 10, first Fresnel lens 52r, 52g, and 52b in the illumination beam for each component wavelength modulating section 114r, 114g, 114b reduces the angle of light directed into modulator panel 60, providing a measure of collimation, thereby improving the contrast performance. The second Fresnel lens 53r, 53g, and 53b would be placed in modulated component wavelength beam 54r, 54g, 54b from LC modulator panel 60, to direct the light toward the entrance pupils of corresponding projection lenses 62r, 62g, and 62b.

In an alternate embodiment, a pair of crossed cylindrical Fresnel lenses can be used in one or more of component wavelength modulating sections 114r, 114g, 114b as an alternative to the conventional circularly symmetric Fresnel lens types. Crossed cylindrical Fresnel lenses are rotated with respect to each other and can be further rotated at an angle to LC modulator panel 60 to minimize or eliminate moiré and aliasing.

In one embodiment, projection apparatus 50 uses anti-ghost Fresnels, such as those produced by manufacturers such as Reflexite Corporation, Rochester, N.Y. As another alternative, holographic optical components could be used in the place of one or more of Fresnel lenses 52r, 52g, and 52b. Glass molded Fresnel lenses would help to minimize problems with stress birefringence from light absorption, such as decreased contrast uniformity across the image.

Control Loop for Projection Lens 62r, 62g, 62b Alignment

Figure 7:
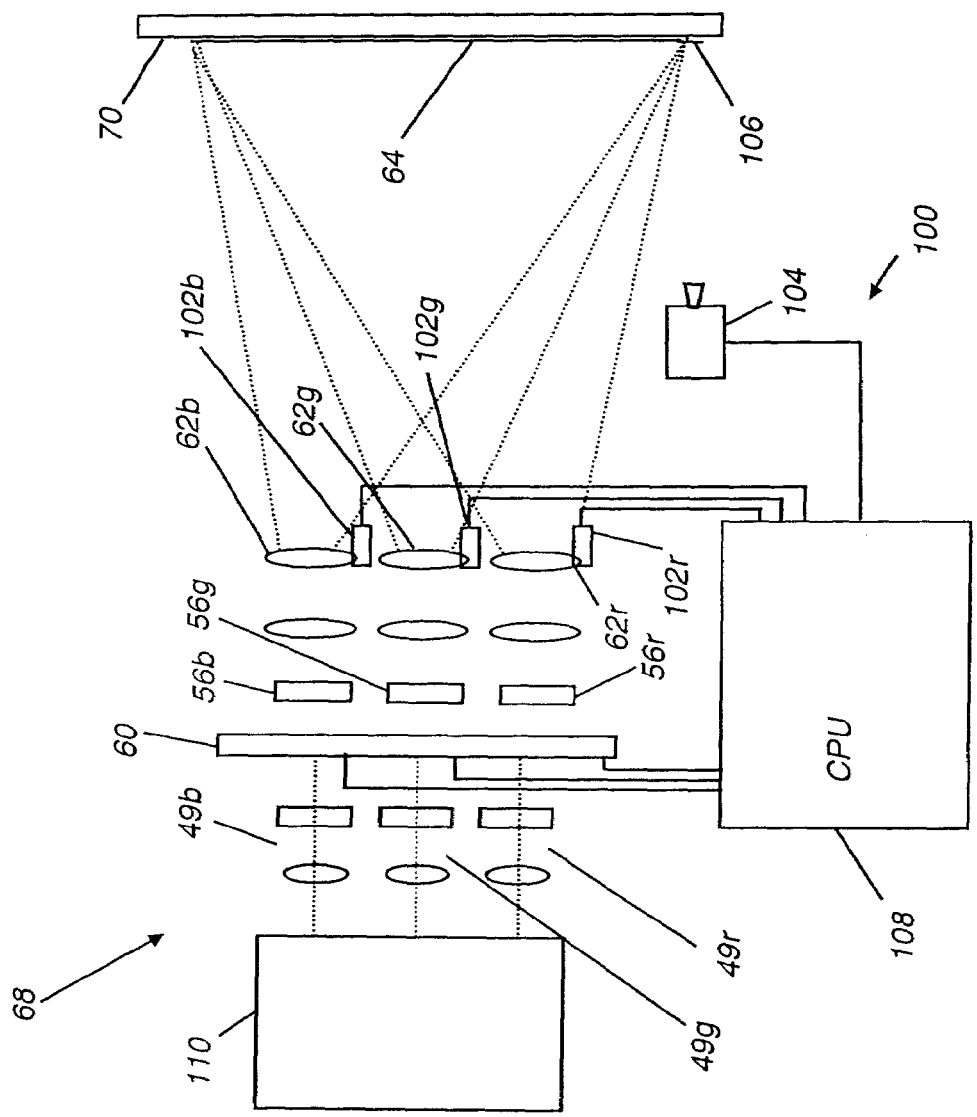
FIG. 7 is a schematic block diagram of a control loop for automated alignment of projection lenses in one embodiment.

FIG. 7 shows a control loop 100 arranged for automated alignment of projection lenses 62r, 62g, and 62b. A sensor 104, such as an electronic camera, senses light from a target 106 that may be part of image 64 on display surface 70 or may be separated from image 64. Target 106 is devised to show proper overlap of the modulated component color images projected onto display surface 70. Methods such as those disclosed in commonly-assigned U.S. Pat. No. 6,793,351 (Nelson et al.) may be used to detect proper overlap at a control logic processor 108 and to counter any offset between colors detected by sensor 104. Adjustment of projection lenses 62r, 62g, and 62b may be effected using a combination of methods. Alignment in units of complete pixels can be accomplished electronically, by shifting the position of the corresponding red, green, or blue component modulating sections 80r, 80g, and 80b, using a method similar to that disclosed in U.S. Pat. No. 5,729,245 (Gove et al.) Corresponding actuators 102r, 102g, and 102b, such as stepping motors or piezoelectric actuators can be used to effect fine tuning alignment adjustment, either of full pixels or of fractional increments of a pixel, by moving projection lenses 62r, 62g, and 62b themselves. In one embodiment, a combination of the two methods is used, first attempting alignment by shifting the relative positions of one or more of red, green, or blue component modulating sections 80r, 80g, and 80b, utilizing pixels in border portions 82r, 82g, and 82b as needed. Following this shifting of red, green, or blue component modulating sections 80r, 80g, and 80b, fine tuning adjustment is then performed by driving actuators 102r, 102g, and 102b as needed.

ALTERNATE EMBODIMENTS

The embodiments shown in FIGS. 2, 4, 7, and 10 show projection apparatus 50 using the conventional set of red, green, and blue component colors. Other arrangements are possible, including the use of additional colors, to provide an enhanced color gamut. Or, different component colors could be used to form color image 64. In an alternate embodiment using four colors, two LC modulator panels 60 could be used, each LC modulator panel 60 configured to have two component-color modulating sections.

In an alternate embodiment, a single LC modulator panel 60 is used in combination with a scrolling color filter device that separates the light into color bands, separated by light blocking regions. The color bands can be scanned across LC modulator panel 60 using prism optics or using a color wheel or other type of color scrolling mechanism. A blocking region is utilized to prevent color blurring during transition times between the colors. The modulator is subsequently modulated in synchronization with the particular color light provided to apply the appropriate portion of the composite color image. Scrolling color background and techniques are described, for example, in an article entitled "Sequential Color Recapture and Dynamic Filtering: A Method of Scrolling Color" by D. Scott Dewald, Steven M. Penn, and Michael Davis in *SID 01 Digest*, pages 1-4.

Figure 15:
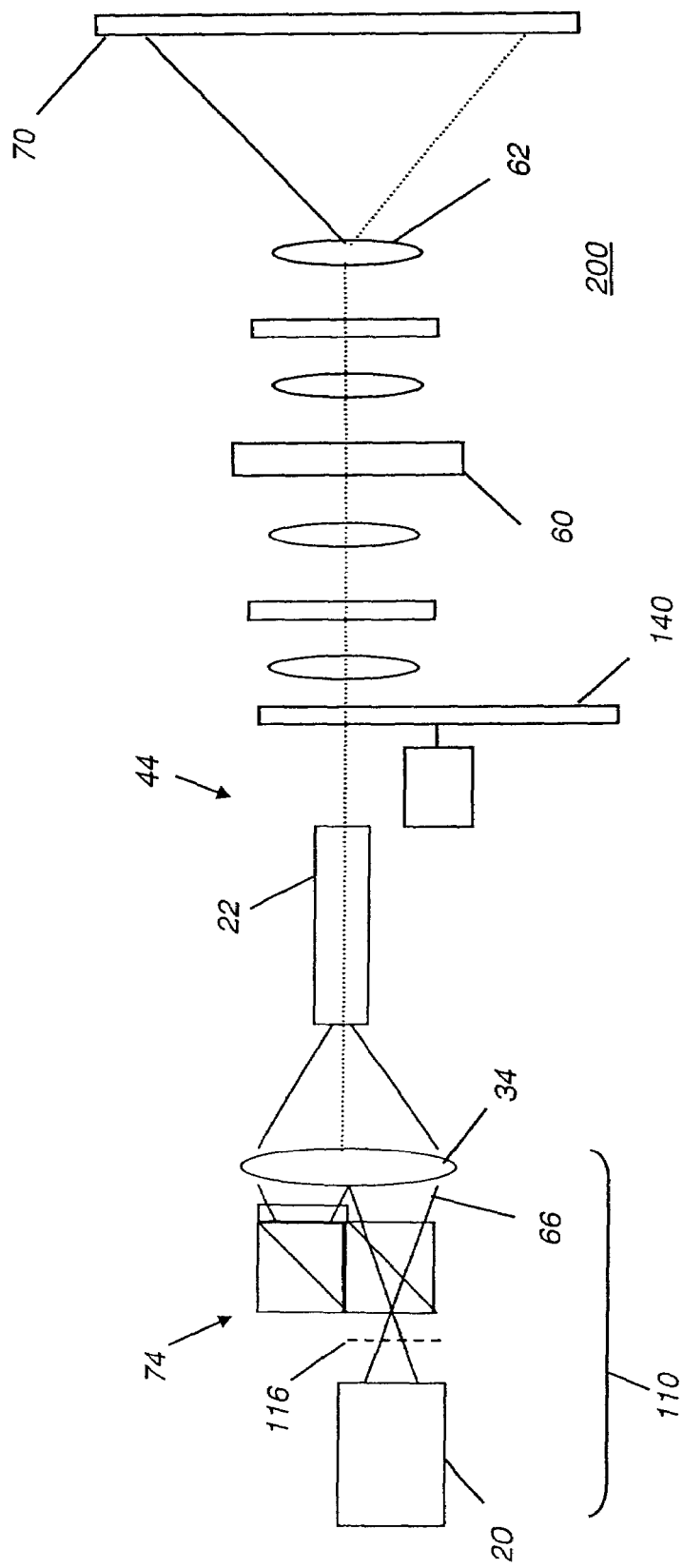
FIG. 15 is a schematic block diagram showing an embodiment using a color wheel as color scrolling device.

In the alternate embodiment shown in FIG. 15, a projection apparatus 200 uses a color scrolling element 140, such as a color scrolling wheel or some combination of components including a color separator with a scanning prism, for example, that sequentially scans color light of various wavelengths using techniques familiar to those skilled in the digital projector arts. LC modulator panel 60 sequentially modulates each incident color of light provided from color scrolling element 140 to provide modulated light to a projection lens 62.

Figure 11:
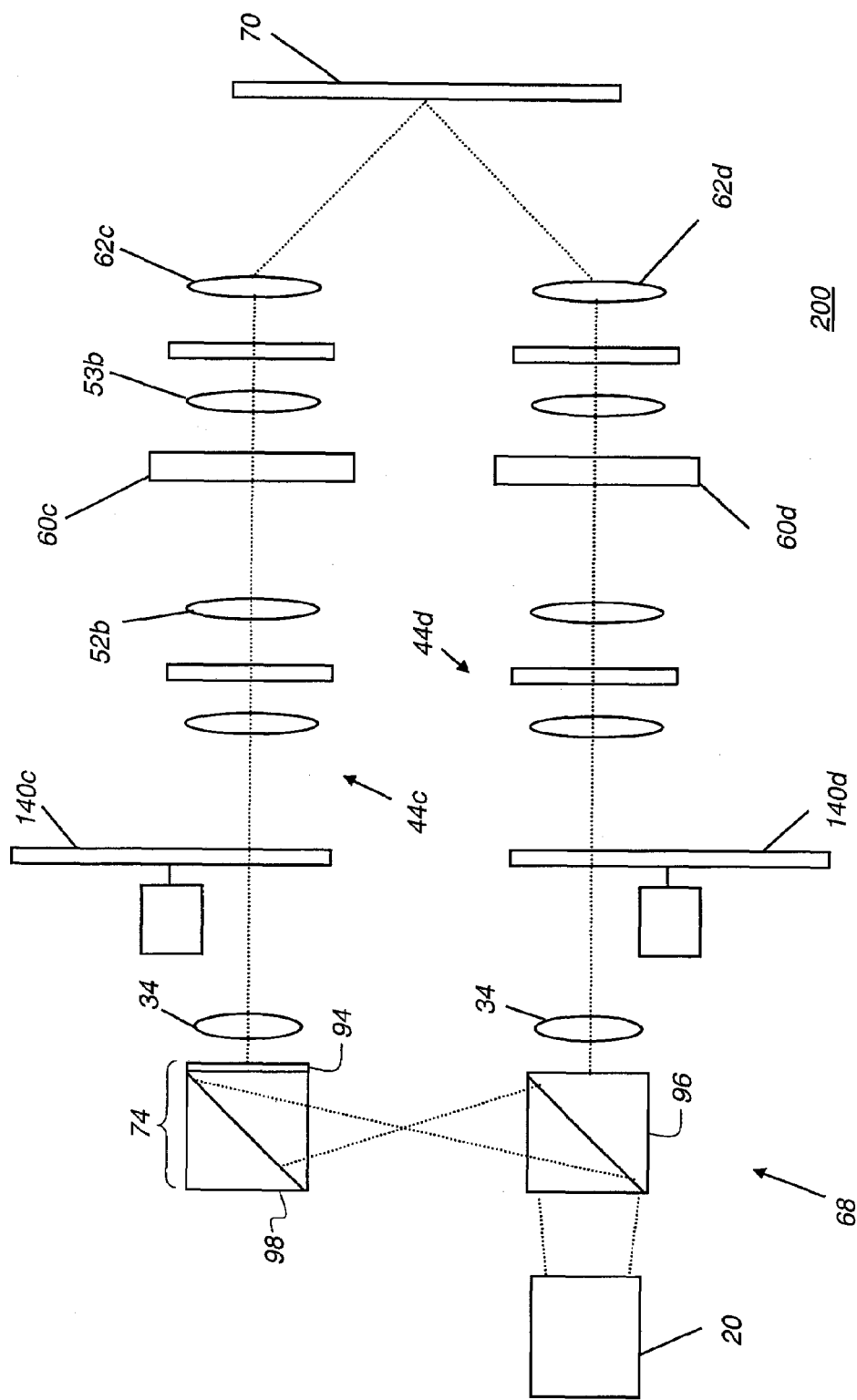
FIG. 11 is a schematic block diagram showing an alternate embodiment using color scrolling in a two panel apparatus.

Another alternate embodiment of projection apparatus 200, as shown in FIG. 11, utilizes two modulator panels 60c and 60d, each with a color scrolling element 140c and 140d, respectively. Each modulator panel 60c, 60d has supporting optical components in its corresponding illumination path 44c, 44d, similar to that described with reference to FIG. 2, and provides modulated light as a component wavelength beam 54c, 54d to a projection lens 62c, 62d. Polarizer 74 and its components, polarizer 96, mirror 98, and half waveplate 94 are described above with reference to FIG. 5. Illumination section 68 of these embodiments using color scrolling components could employ color separation, color scrolling and light-directing techniques similar to those disclosed in U.S. Pat. No. 6,280,034 (Brennesholtz), for example.

Where color scrolling element 140c, or 140d is a color scrolling wheel, a sequence utilizing repeated complementary pairs of colors may be particularly advantageous. In such an arrangement, color scrolling element 140c could be a filter wheel having a red, green, and blue filter for forming its set of colors. Color scrolling element 140d would then be a filter wheel having complementary cyan, magenta, and yellow filter for forming its set of colors. The sequencing of these filter wheels would be timed so that the combined image formed from the two modulator panels 60c, 60d would be additive with respect to color, with the combined image appearing to be white during each part of the scrolling sequence. This would be the case, for example, when simultaneously projecting each primary color (red, green, blue) paired with its corresponding complement color (cyan, magenta, yellow). Combining this approach with the advantages of enhanced brightness and improved imaging performance provided by the present invention allows an expanded color gamut over earlier designs.

In an alternate embodiment, instead of providing two separate modulator panels 60c, 60d, a single modulator panel 60 could be subdivided into two segments. This would provided an arrangement similar to that shown in FIG. 3, but with two segments instead of three as shown in the figure. One segment would serve for modulator panel 60c, the other segment for modulator panel 60d.

Figure 12:
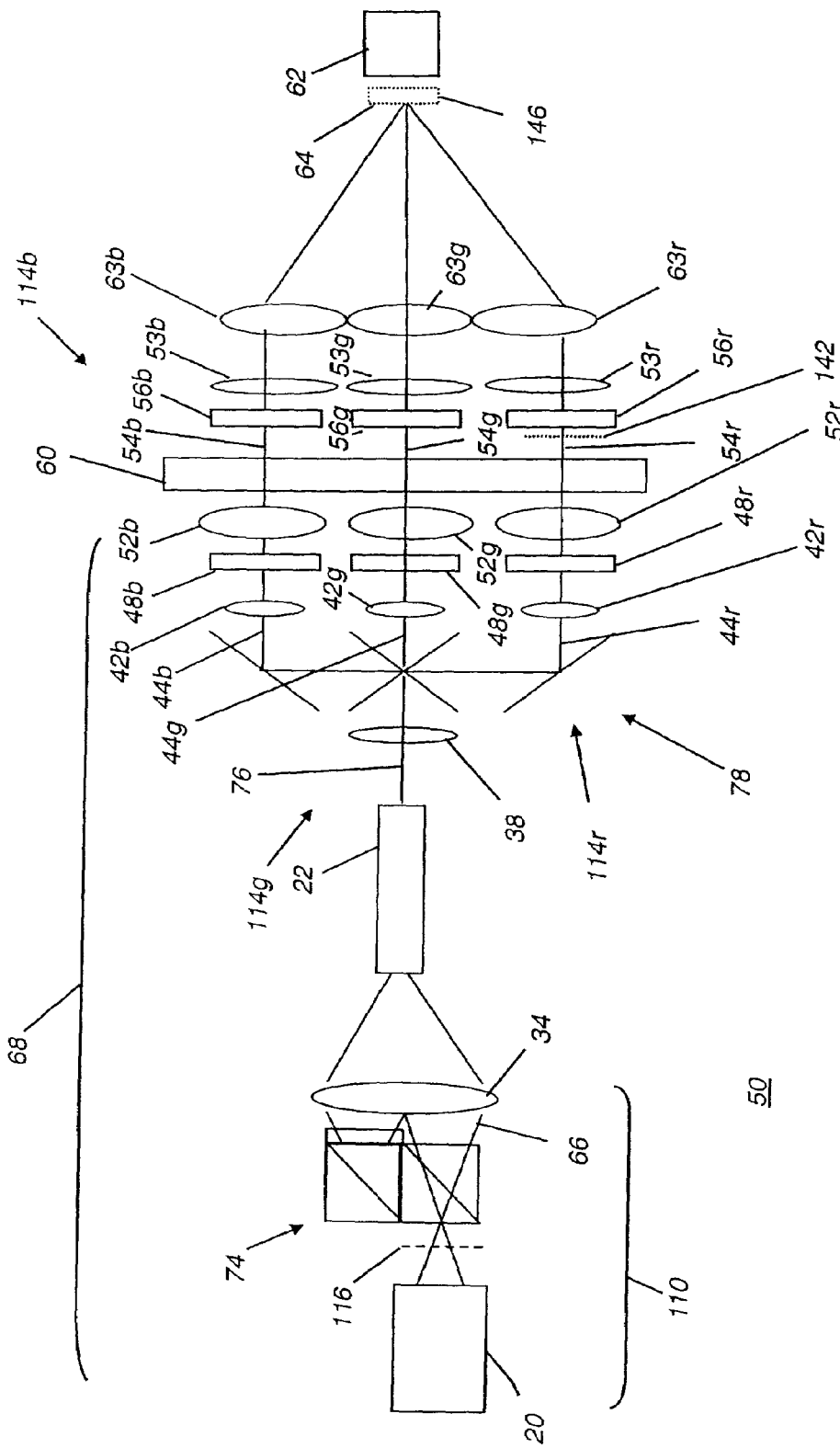
FIG. 12 is a schematic block diagram showing an alternate embodiment in which an intermediate image is formed for projection.

Another alternate embodiment entails combining images from the three color component wavelength modulating sections 114r, 114g, and 114b at an intermediate image plane. Referring to FIG. 12, there is shown projection apparatus 50 wherein each component wavelength modulating section 114r, 114g, and 114b provides a component of the modulated image to form image 64 as an intermediate image 146 for projection by a projection lens 62. Lenses 63r, 63g, and 63b direct modulated light to form intermediate image 146. With this arrangement, intermediate image 146 may actually be smaller than modulator panel 60, so that intermediate image 146 can be magnified to the large screen size by a single projection lens. Optical convergence can be done at the time of fabrication, so that only a single projection lens adjustment is necessary for an operator. This approach has been shown to be of value as demonstrated in commonly-assigned U.S. Pat. No. 6,808,269 (Cobb) and U.S. Pat. No. 6,676,260 (Cobb et al.)

Figure 8:
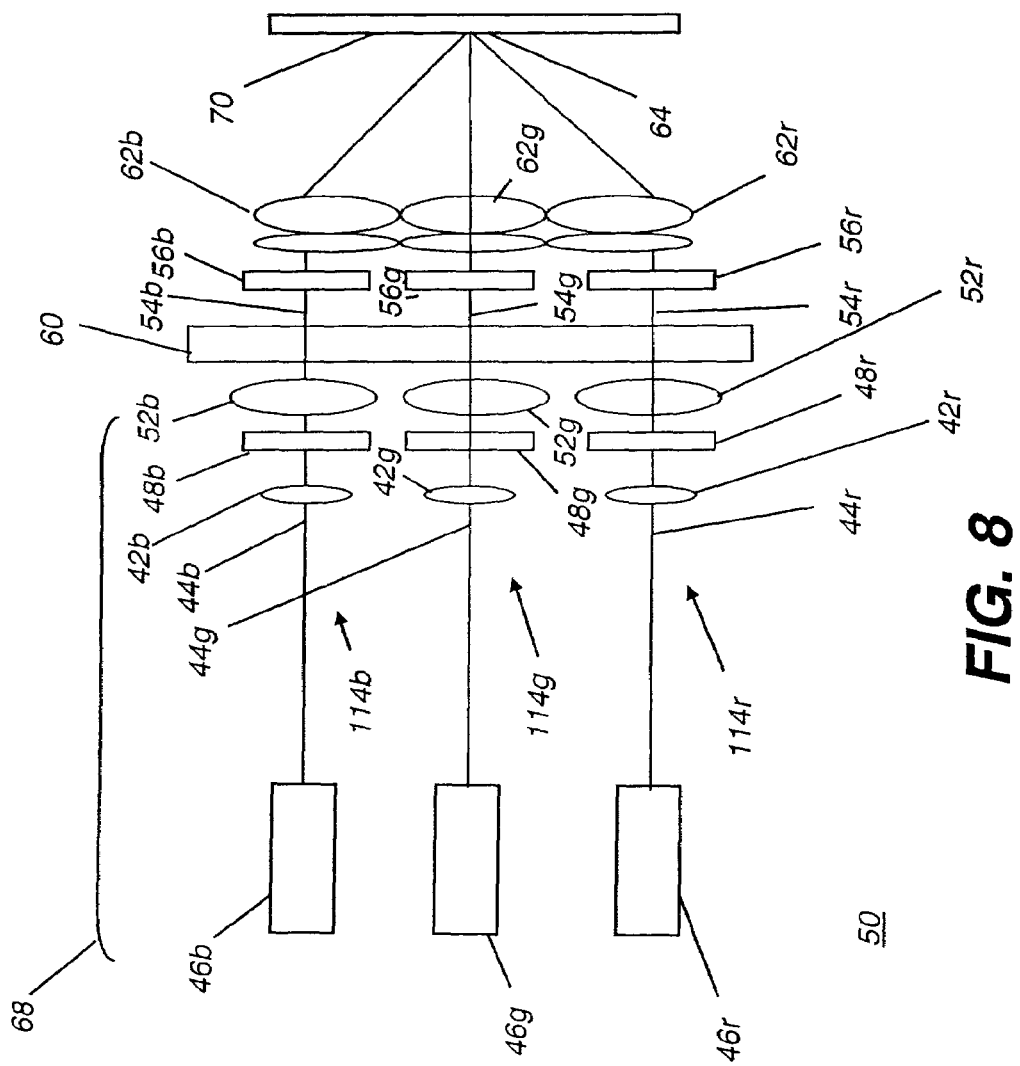
FIG. 8 is a schematic block diagram showing a projection apparatus in an alternate embodiment.

Referring to FIG. 8, there is shown a block diagram of projection apparatus 50 in an alternate embodiment using individual red, green, and blue light sources 46r, 46g, and 46b. Light sources 46r, 46g, and 46b may include lasers, LEDs, or other light source types and may also be supported by light conditioning components such as uniformizers, as were described with reference to FIG. 2. Light sources 46r, 46g, and 46g may be polarized or provided with polarizers.

One advantage of the present invention is that compensators may not be needed or at least that the need for compensators may be minimized. As is well known in the art, there are two basic types of compensator films. An uniaxial film with its optic axis parallel to the plane of the film is called an A-plate. An uniaxial film with its optic axis perpendicular to the plane of the film is called a C-plate. Alternately, the A-plate can be described as providing XY birefringence (an anisotropic medium with XY retardance) in the plane of the compensator, while the C-plate provides Z birefringence along the optical axis in the direction of beam propagation through the compensator. A uniaxial material with $n_e$ greater than $n_o$ is called positively birefringent. Likewise, a uniaxial material with $n_e$ smaller than $n_o$ is called negatively birefringent. Both A-plates and C-plates can be positive or negative depending on their $n_e$ and $n_o$ values. As is well known in art, C-plates can be fabricated by the use of uniaxially compressed polymers or casting cellulose acetate, while A-plates can be made by stretched polymer films such as polyvinyl alcohol or polycarbonate.

The present invention minimizes or eliminates the need for C-plate compensators, since using the larger LC panels as modulator panel 60 results in reduced angular sensitivity. Referring to FIG. 12, a dotted line 142 indicates a possible position for an optional A-plate compensator in red component wavelength beam 54r. Other component wavelength modulating sections 114r, 114g, and 114b may also benefit from an A-plate compensator in a similar position. Alternately, a compensator could be disposed in the illumination path, such as prior to Fresnel lens 52r, 52g, 52b, for example. In other embodiments, A-plate compensation may be supplemented with some additional level of C-plate compensation. In still other embodiments, a C-plate compensator would be sufficient. Any of a number of types of compensator can be used, including film based compensators, compensators formed from a multilayer thin film dielectric stack, and compensators using formed birefringent structures, for example.

Figure 13:
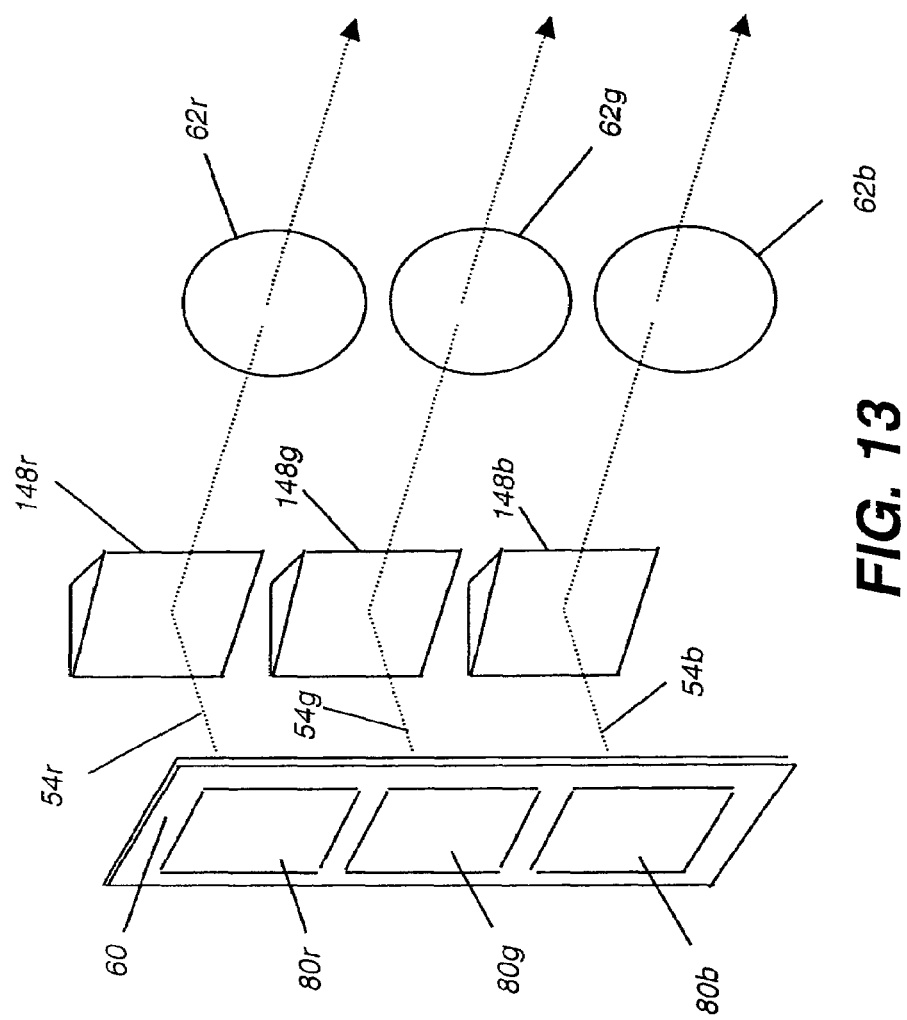
FIG. 13 is a schematic diagram, in perspective, showing an alternate embodiment using a polarization beamsplitter in each color channel.

In an alternate embodiment, as shown in the block diagram of a portion of a projection apparatus in FIG. 13, shown in perspective for clarity, a polarization beamsplitter 148r, 148g, 148b is provided as an analyzer for each modulated component wavelength beam 54r, 54g, 54b from modulator panel 60. Polarization beamsplitters 148r, 148g, 148b, wire grid polarization beamsplitters in one embodiment, turn the optical path of each component wavelength beam 54r, 54g, 54b. In the embodiment of FIG. 13, projection lenses 62r, 62g, and 62b then form an image on display surface 70. In another alternate embodiment, an intermediate image could be formed, as was described above with reference to FIG. 12.

Figure 16:
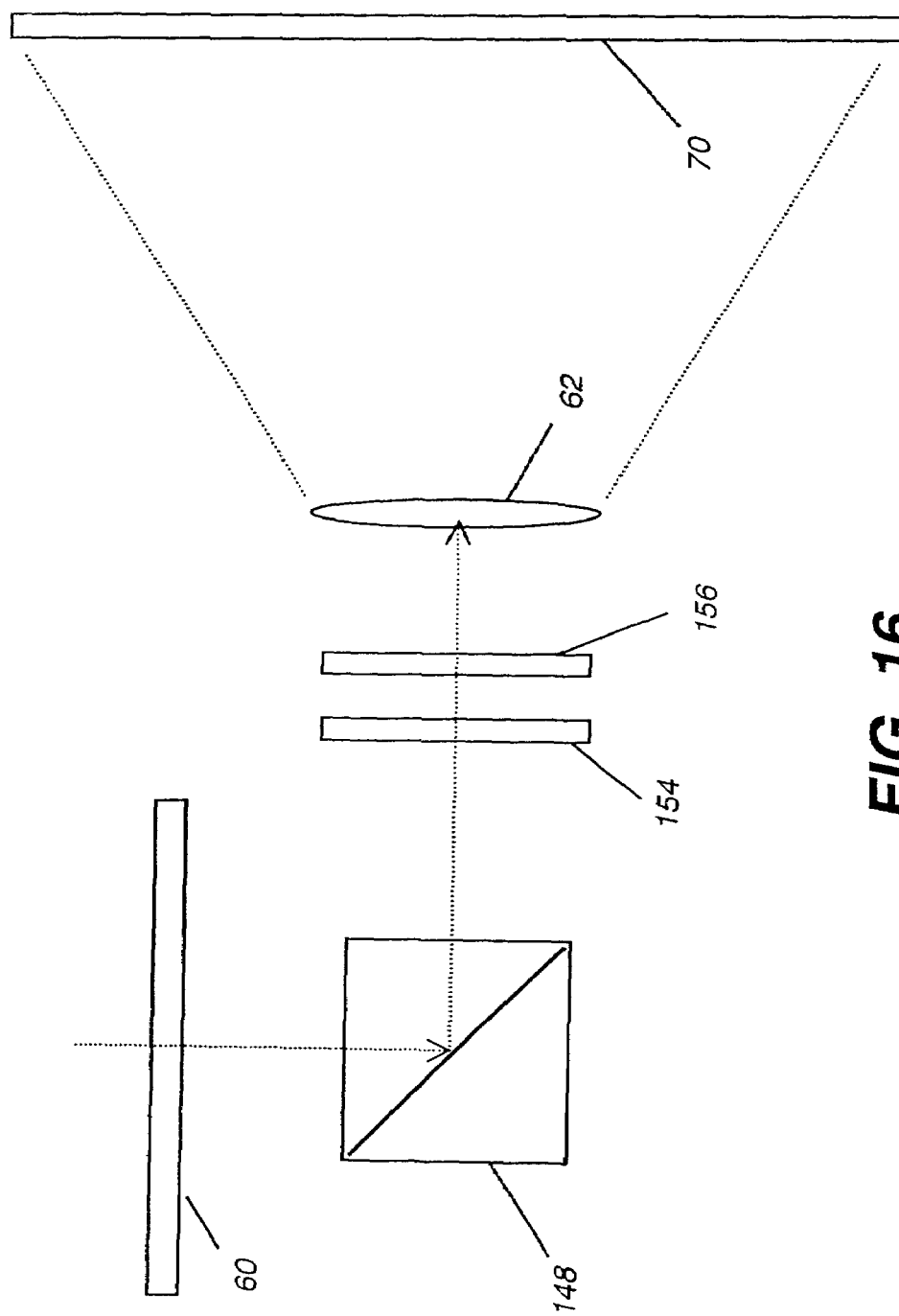
FIG. 16 is a schematic block diagram showing the use of a polarization beamsplitter as an analyzer in one color channel.

Referring to FIG. 16, there is shown a portion of a one color channel using a reflective polarization beamsplitter 148 as an analyzer. In this embodiment, an optional additional analyzer 154 can be used, along with a Fresnel lens 156.

Figure 14:
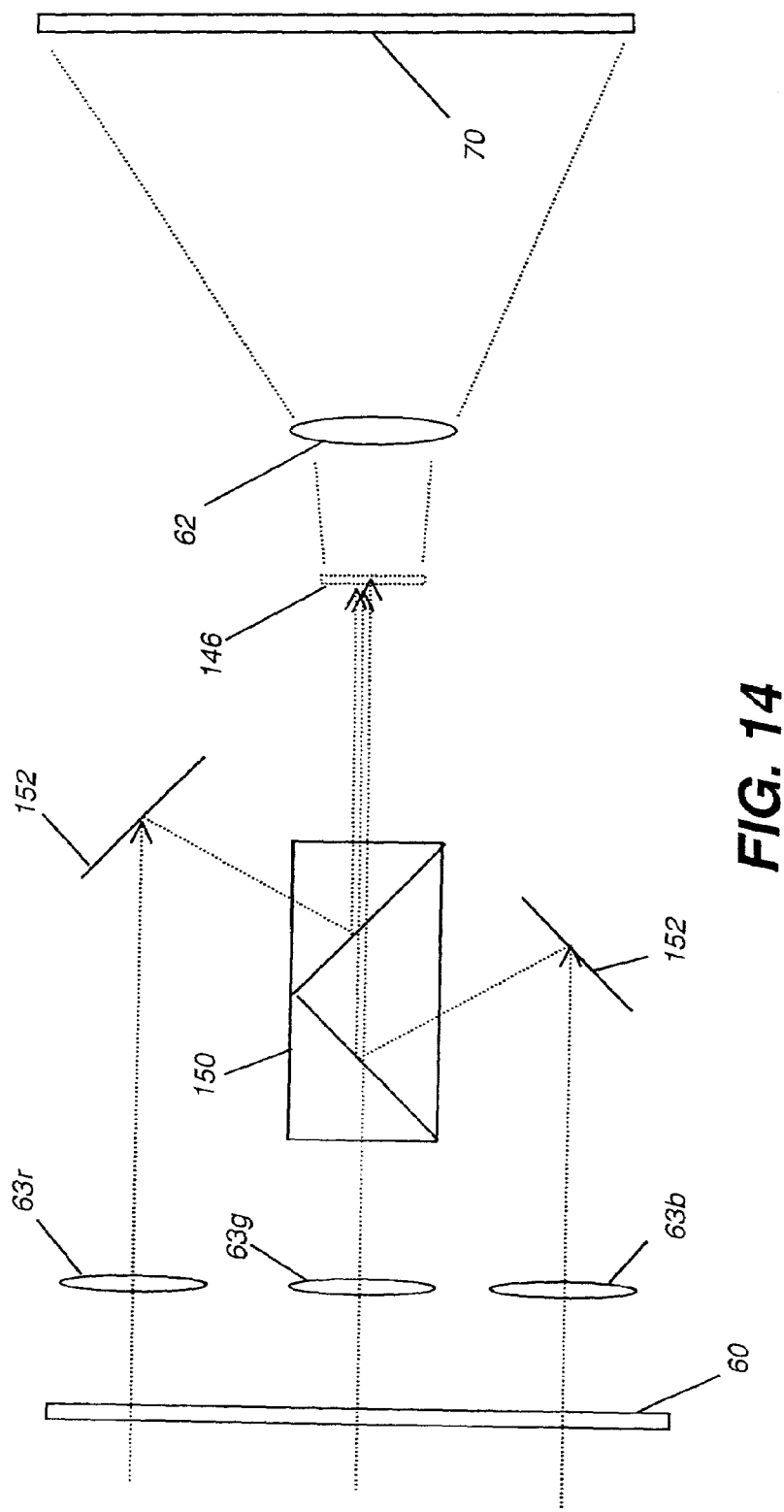
FIG. 14 is a schematic block diagram showing an alternate embodiment of a portion of a color projection apparatus using a V-prism as color combiner for modulated light.

Referring to FIG. 14, there is shown a schematic block diagram of an alternate embodiment in which modulated light from each color channel is directed by lens 63r, 63g, 63b to a V-prism assembly 150. V-prism assembly 150 combines the modulated light onto a single optical path for forming intermediate image 146 at the pupil of projection lens 62. V-prism assembly 150 is one type of color combiner using dichroic surfaces and working in combination with mirrors 152 to direct light toward projection lens 62. A commonly-assigned U.S. Pat. No. 6,676,260 (Cobb et al.) describes V-prism use in projection apparatus.

Where polarization beamsplitters 148r, 148g, 148b are wire grid polarization beamsplitters, such as those provided by Moxtek, Inc., rotation of one of these devices about the optical axis can be used to provide a measure of compensation, using methods disclosed in commonly-assigned U.S. Pat. No. 6,805,445 (Silverstein et al.)

Figure 1:
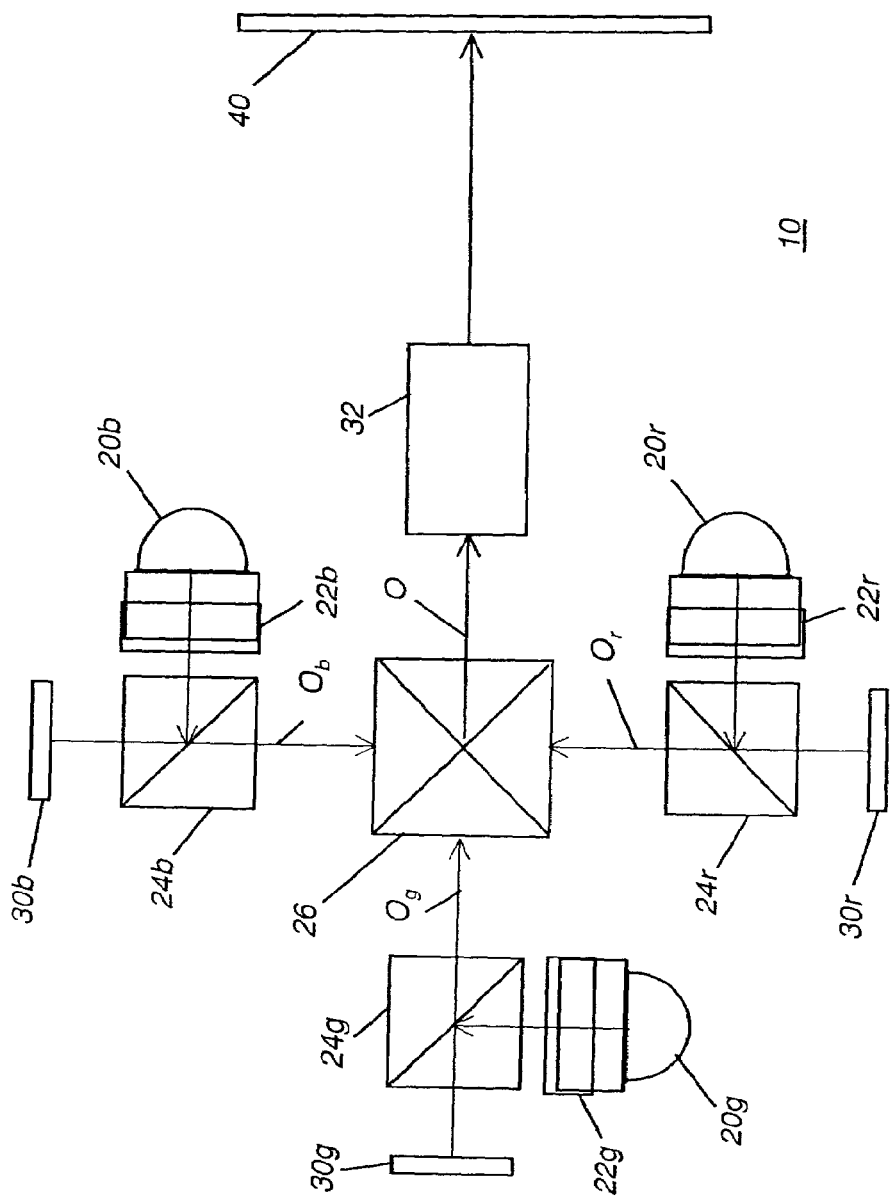
FIG. 1 is a block diagram showing a conventional projection apparatus using LCOS LCD devices.

By comparison with the conventional projection apparatus 10 in FIG. 1, the arrangement of projection apparatus 50 in FIGS. 2, 4, 8 and 12, and projection apparatus 200 in FIG. 11 when adapted as described above, provides a system capable of considerably higher brightness levels. Where spatial light modulators 30r, 30g, and 30b of the conventional arrangement in FIG. 1 are miniaturized LCOS LC devices, the LaGrange invariant and energy-carrying capacity of these devices constrains the amount of brightness that is available to a range from about 5,000 to no more than about 25,000 lumens. In contrast, the embodiment of FIGS. 2 and 4 enjoys an expanded luminance range, allowing projection in excess of 30,000 lumens.

The dimensions of LC modulator panel 60 can be optimized to suit the performance requirements of projection apparatus 50. In contrast to the miniaturized LCOS LCD solutions previously used, LC modulator panel 60 can be a large scale device larger than typical laptop displays, up to 17-20 diagonal inches or more. Although early LC panels were disappointingly slow, ongoing work has provided speed improvements of 100% and better and it appears that increased speeds are feasible. Improved response times of 8 msec or shorter have been reported. Ideally, modulator panel 60 can be sized just big enough such that the full lamp system efficiency can be utilized and small enough to give the fastest response time, with the optimum size for pixel structure and electronics to be fabricated utilizing standard TFT panel methods.

Sizing a TFT panel to be best suited to the lamp system efficiency involves a number of considerations. For example, to utilize a Cermax style lamp with a 2.0 mm arc gap, measurements show that the full efficiency of the lamp can be captured by a system having a Lagrange invariant, defined as the product of the numerical aperture times the diagonal of the modulator area, of approximately 10. A system designed at f/10.0 has numerical aperture (NA) equal to 0.05. Thus, the device diagonal would need to be 200 mm. This value would need to be doubled in order to capture both polarization states. Additionally this modulation area would be required for each wavelength band chosen. Thus, from a system efficiency standpoint, a panel that is slightly larger than 1074×358 mm would be very efficient and offer the best potential for fast transition times. The main difficulty would be to fabricate pixel electronics to be small enough to accommodate this size at the high resolutions desired: 2048×1024 or 4096×2048 for each wavelength band modulated.

With its capability for using brighter light sources and use of a large-area image generator, projection apparatus 50 using TFT LC modulator panel 60 as in FIGS. 2 and 5 offers an overall efficiency on the order of 40-50%. This is in contrast to the typical efficiency of earlier LCOS LCD designs of FIG. 1, where efficiencies of no more than about 5 to 10% are common. Wire grid polarizers are particularly advantageous, since they exhibit relatively low light absorption. In general, a polarizer having light absorption of less than about 20% would be preferred. There may also be improved performance obtained by orienting the wire grid surface itself toward modulator panel 60 in the embodiments described above.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, the embodiments described hereinabove can be used to form an intermediate image, as was described with reference to FIG. 12, or to provide color modulated beams that are separately projected onto display surface 70. Alternative types of more recently introduced TFT components are possible, including organic thin-film transistors (OTFTs) based on conjugated polymers, oligomers, or other molecules and thin film transistors utilizing monolayers of well-dispersed single wall carbon nanotubes.

Thus, what is provided is an apparatus and method for an electronic projection apparatus using a TFT LC panel for forming the projection image.

PARTS LIST 10 projection apparatus
20 light source
20r light source, red
20g light source, green
20b light source, blue
22 uniformizing optics
22r uniformizing optics, red
22g uniformizing optics, green
22b uniformizing optics, blue
24r polarizing beamsplitter, red
24g polarizing beamsplitter, green
24b polarizing beamsplitter, blue
26 dichroic combiner
30r spatial light modulator, red
30g spatial light modulator, green
30b spatial light modulator, blue
32 projection lens
34 lens
38 lens
40 display surface
42r condensing lens, red
42g condensing lens, green
42b condensing lens, blue
44 illumination path
44c illumination path
44d illumination path
44r illumination path, red
44g illumination path, green
44b illumination path, blue
46r light source, red
46g light source, green
46b light source, blue
48r polarizer, red
48g polarizer, green
48b polarizer, blue
50 projection apparatus
52r Fresnel lens, red
52g Fresnel lens, green
52b Fresnel lens, blue
53r Fresnel lens, red
53g Fresnel lens, green
53b Fresnel lens, blue
54c component wavelength beam
54d component wavelength beam
54r component wavelength beam, red
54g component wavelength beam, green
54b component wavelength beam, blue
56r analyzer, red
56g analyzer, green
56b analyzer, blue
60 modulator panel
60c modulator panel
60d modulator panel
62 projection lens
62c projection lens
62d projection lens
62r projection lens, red
62g projection lens, green
62b projection lens, blue
63r lens, red
63g lens, green
63b lens, blue
64 image
66 polarized illumination beam
68 illumination section
70 display surface
74 polarizer
76 uniformized polarized beam
78 color separator
80r red component modulating section
80g green component modulating section
80b blue component modulating section
82r border portion, red
82g border portion, green
82b border portion, blue
84a light blocking segment
84b light blocking segment
90a dichroic surface
90b dichroic surface
92 turning mirror
94 half wave plate
96 polarizer
98 mirror
100 control loop
102r actuator, red
102g actuator, green
102b actuator, blue
104 sensor
106 target
108 control logic processor
110 polarized light providing apparatus
114r component wavelength modulating section, red
114g component wavelength modulating section, green
114b component wavelength modulating section, blue
116 shutter
118 LC modulator panel
120 LC material
122 thin-film transistor (TFT)
124 ITO layer
126 glass
128 polarizer
130 compensation film
132 color filter array
134 antireflection coating
136 antireflection coating
140 color scrolling element
140c color scrolling element
140d color scrolling element
142 line
146 intermediate image
148 polarization beamsplitter
148r polarization beamsplitter, red
148g polarization beamsplitter, green
148b polarization beamsplitter, blue
150 V-prism assembly
152 mirror
154 analyzer
156 Fresnel lens
200 projection apparatus

The invention claimed is:
1. A projection apparatus comprising:
 a) an illumination section comprising:
  i) a light source providing a substantially unpolarized illumination beam of multiple wavelengths;

ii) a multiple wavelength polarizer for polarizing and splitting the substantially unpolarized illumination beam to provide a first and second substantially polarized illumination beams of multiple wavelengths;

iii) a first and second uniformizer for conditioning the substantially polarized illumination beam of multiple wavelengths to provide a first and second uniformized polarized beam of multiple wavelengths;

iv) a first color scrolling element for providing a first repeating, scrolled sequence of colors from a first set of colors, thereby providing a first component wavelength illumination, a second component wavelength illumination, and a third component wavelength illumination from the first multiple wavelength beam;

v) a second color scrolling element for providing a second repeating, scrolled sequence of colors from a second set of colors, thereby providing a fourth component wavelength illumination, a fifth component wavelength illumination, and a sixth component wavelength illumination from the second multiple wavelength beam;

b) a first component wavelength modulator for accepting the sequence of first, second, and third component wavelength illumination from the first color scrolling element and sequentially modulating the first, second, and third component wavelength illumination to provide a first modulated component wavelength beam to a first lens for projection toward a display surface; and c) a second component wavelength modulator for accepting the sequence of fourth, fifth, and sixth component wavelength illumination from the second color scrolling element and sequentially modulating the fourth, fifth, and sixth component wavelength illumination to provide a second modulated component wavelength beam to a second lens for projection toward the display surface.

2. The projection apparatus of claim 1 wherein the first set of colors is red, green, and blue.

3. The projection apparatus of claim 1 wherein the second set of colors is cyan, magenta, and yellow.

4. The projection apparatus of claim 1 wherein paired complementary colors are projected at substantially the same time.

5. The projection apparatus of claim 1 wherein the first component wavelength modulating section comprises a first illumination path Fresnel lens for focusing first, second, and third component wavelength illumination from the first scrolling element toward the first portion of the transmissive liquid crystal modulator panel.

6. The projection apparatus of claim 5 wherein the first component wavelength modulating section further comprises a modulated beam Fresnel lens for directing a component wavelength beam from the transmissive liquid crystal modulator panel toward a projection lens.

7. The projection apparatus of claim 6 wherein the modulated beam Fresnel lens comprises crossed cylindrical Fresnel lenses.

8. The projection apparatus of claim 1 wherein the first color scrolling element comprises a color filter wheel.

9. The projection apparatus of claim 5 wherein the first illumination path Fresnel lens is a glass Fresnel lens.

10. The projection apparatus of claim 6 wherein the modulated beam Fresnel lens is a glass Fresnel lens.

11. A projection apparatus according to claim 1 wherein the light source is taken from the group consisting of an LED, an LED array, a Xenon lamp, and a Mercury lamp.

12. A projection apparatus according to claim 1 wherein the uniformizer comprises a lenslet array.

13. A projection apparatus according to claim 1 wherein the uniformizer comprises an integrating bar.

14. A projection apparatus according to claim 1 wherein the transmissive liquid crystal modulator comprises thin film transistors.

15. A projection apparatus according to claim 1 wherein at least one component wavelength polarizer is spaced apart from the monochrome transmissive liquid crystal modulator panel.

16. A projection apparatus according to claim 1 wherein the multiple wavelength polarizer is a wire grid polarizer.

17. A projection apparatus according to claim 16 wherein the wire surface side of the wire grid polarizer device is oriented toward the liquid crystal modulator panel.

18. A projection apparatus comprising:

a) an illumination section comprising:

i) a light source providing a substantially unpolarized illumination beam of multiple wavelengths;

ii) a multiple wavelength polarizer for polarizing the substantially unpolarized illumination beam to provide a substantially polarized illumination beam of multiple wavelengths;

iii) a uniformizer for conditioning the substantially polarized illumination beam of multiple wavelengths to provide a uniformized polarized beam of multiple wavelengths;

iv) a first color scrolling element for providing a first repeating, scrolled sequence of colors from a first set of colors, thereby providing a first component wavelength illumination, a second component wavelength illumination, and a third component wavelength illumination;

v) a second color scrolling element for providing a second repeating, scrolled sequence of colors from a second set of colors, thereby providing a fourth component wavelength illumination, a fifth component wavelength illumination, and a sixth component wavelength illumination;

b) a first component wavelength modulating section for accepting the sequence of first, second, and third component wavelength illumination from the first color scrolling element and sequentially modulating the first, second, and third component wavelength illumination at a first transmissive liquid crystal modulator panel to provide a first modulated component wavelength beam to a first lens for projection toward a display surface; and c) a second component wavelength modulating section for accepting the sequence of fourth, fifth, and sixth component wavelength illumination from the second color scrolling element and sequentially modulating the fourth, fifth, and sixth component wavelength illumination at a second transmissive liquid crystal modulator panel to provide a second modulated component wavelength beam to a second lens for projection toward the display surface.

19. The projection apparatus of claim 18 wherein the first set of colors is red, green, and blue.

20. The projection apparatus of claim 18 wherein the second set of colors is cyan, magenta, and yellow.

21. The projection apparatus of claim 18 wherein blue and yellow colors are projected at substantially the same time.

22. The projection apparatus of claim 18 wherein the first component wavelength modulating section comprises a first illumination path Fresnel lens for focusing first, second, and third component wavelength illumination from the first scrolling element toward the first portion of the transmissive liquid crystal modulator panel.

23. The projection apparatus of claim 22 wherein the first component wavelength modulating section further comprises a modulated beam Fresnel lens for directing a component wavelength beam from the transmissive liquid crystal modulator panel toward a projection lens.

24. The projection apparatus of claim 23 wherein the modulated beam Fresnel lens comprises crossed cylindrical Fresnel lenses.

25. The projection apparatus of claim 18 wherein the first color scrolling element comprises a color filter wheel.

26. The projection apparatus of claim 22 wherein the first illumination path Fresnel lens is a glass Fresnel.

* * * * *